United States Patent
Yamasaki

(10) Patent No.: US 8,300,136 B2
(45) Date of Patent: Oct. 30, 2012

(54) IMAGING APPARATUS FOR DETECTING A FACE IMAGE AND IMAGING METHOD

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 12/490,315

(22) Filed: Jun. 24, 2009

(65) Prior Publication Data

US 2009/0322935 A1   Dec. 31, 2009

(30) Foreign Application Priority Data

Jun. 26, 2008 (JP) ................................. 2008-167872
Jan. 30, 2009 (JP) ................................. 2009-020232

(51) Int. Cl.
H04N 5/232 (2006.01)
H04N 5/222 (2006.01)
G03B 13/00 (2006.01)

(52) U.S. Cl. ................................... 348/346; 348/333.02
(58) Field of Classification Search .................. None
See application file for complete search history.

(56) References Cited

U.S. PATENT DOCUMENTS

| | | | |
|---|---|---|---|
| 7,733,412 B2 | 6/2010 | Takayama | |
| 2006/0012702 A1* | 1/2006 | Kawahara et al. | 348/345 |
| 2006/0192784 A1* | 8/2006 | Yamaji et al. | 345/473 |
| 2007/0003267 A1 | 1/2007 | Shibutani | |
| 2008/0136958 A1* | 6/2008 | Nakahara | 348/345 |
| 2008/0205870 A1* | 8/2008 | Ueda | 396/125 |
| 2008/0278587 A1* | 11/2008 | Izawa | 348/207.11 |
| 2011/0115940 A1* | 5/2011 | Ojima et al. | 348/222.1 |

FOREIGN PATENT DOCUMENTS

| | | |
|---|---|---|
| CN | 1716078 A | 1/2006 |
| CN | 1917585 A | 2/2007 |
| JP | 2004-015212 A | 1/2004 |
| JP | 2006-033437 A | 2/2006 |
| JP | 2007-005966 A | 1/2007 |
| JP | 2007-010898 A | 1/2007 |
| JP | 2007-225897 A | 9/2007 |
| JP | 2007-279333 A | 10/2007 |
| JP | 2008-015860 A | 1/2008 |

* cited by examiner

Primary Examiner — Albert Cutler
(74) Attorney, Agent, or Firm — Canon U.S.A., Inc., IP Division

(57) ABSTRACT

An imaging apparatus includes an imaging unit configured to receive an optical image transmitted through a lens unit and configured to convert the image into image data, a target image detection unit configured to detect a target image satisfying a predetermined form from the image data converted by the imaging unit, and a focus control unit configured to move a focus position of the lens unit by a predetermined amount according to a result of the target image detected by the target image detection unit. The target image detection unit detects the target image from image data converted by the imaging unit in the moved focus position when the focus control unit moves the focus position of the lens unit by the predetermined amount according to the detected result of the target image.

7 Claims, 14 Drawing Sheets

IMAGING APPARATUS FOR DETECTING A FACE IMAGE AND IMAGING METHOD

BACKGROUND OF THE INVENTION

1. Field of the Invention

The present invention relates to an imaging apparatus which detects a target image from a captured image and an imaging method.

2. Description of the Related Art

Conventional imaging apparatus such as digital cameras have various functions for users to successfully shoot a photograph. An example of such a function is an auto focus function for automatically focusing on a subject to be shot in order to acquire preferable images. Further, in recent years, imaging apparatuses have been provided with a function for detecting the face of a person as a subject through image recognition processing, and automatically focusing on the detected face when shooting a photograph of the person.

Many methods have been proposed for detecting the face of a person(s). By one method, a face candidate area is extracted which corresponds to a form of the person's face, and a face area is determined based on features in the candidate area. However, with current face detection techniques for extracting the form of a person's face, the face detection may not be accurately performed when a captured image used for the image recognition processing is blurred. Thus, the imaging apparatus may not perform automatic focusing on the face.

Japanese Patent Application Laid-Open No. 2007-10898 discusses a configuration for detecting a position of a subject's face and automatically focusing on the detected face. This automatic focusing is achieved by moving a focus lens into a predetermined lens position and executing image recognition processing after performing pan-focused processing.

Japanese Patent Application Laid-Open No. 2007-05966 discusses a configuration for moving a focus lens to a plurality of positions to shoot an image and detecting a face of a subject based on the image, in which the face of the subject is sharply captured.

However, when the lens has a shallow depth of field, the face detection may not be executed at a time in the entire distance range in which focusing can be done, from the closest distance end to the infinite distance end. More specifically, the face detection may not be capable of being executed only by moving the focus lens to a predetermined lens position and executing pan-focus processing, in the configuration discussed by Japanese Patent Application Laid-Open No. 2007-10898. Thus, a face of a person to be shot may not be detected, and the person may even be totally out of focus.

According to the method of Japanese Patent Application Laid-Open No. 2007-05966, when the lens has a shallow depth of field, it may be necessary to shoot a number of images while moving the focus position of the lens in order to cover the entire distance range from the closest distance end to the infinite distance end. This increases the number of times of recognition processing for detecting the face area. Every time the face detection is attempted, a number of images may need to be shot to cover the entire distance range from the closest distance end to the infinite distance end, thus the face detection becomes very time consuming.

SUMMARY OF THE INVENTION

According to an aspect of the present invention, an imaging apparatus is provided that includes an imaging unit configured to receive an optical image transmitted through a lens unit and configured to convert the image into image data, a target image detection unit configured to detect a target image satisfying a predetermined form from the image data converted by the imaging unit, and a focus control unit configured to move a focus position of the lens unit by a predetermined amount according to a result of the target image detected by the target image detection unit. The target image detection unit detects the target image from image data converted by the imaging unit in the moved focus position when the focus control unit moves the focus position of the lens unit by the predetermined amount according to the detected result of the target image.

According to another aspect of the present invention, an imaging apparatus is provided that includes an imaging unit configured to receive an optical image transmitted through a lens unit and to convert the image into image data, a target image detection unit configured to detect a target image satisfying a predetermined form from the image data converted by the imaging unit, an operation unit, and a focus control unit configured to move a focus position of the lens unit by a predetermined amount according to an operation of the operation unit. The target image detection unit detects the target image from image data converted by the imaging unit in the moved focus position when the focus control unit moves the focus position of the lens unit by the predetermined amount according to the operation of the operation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
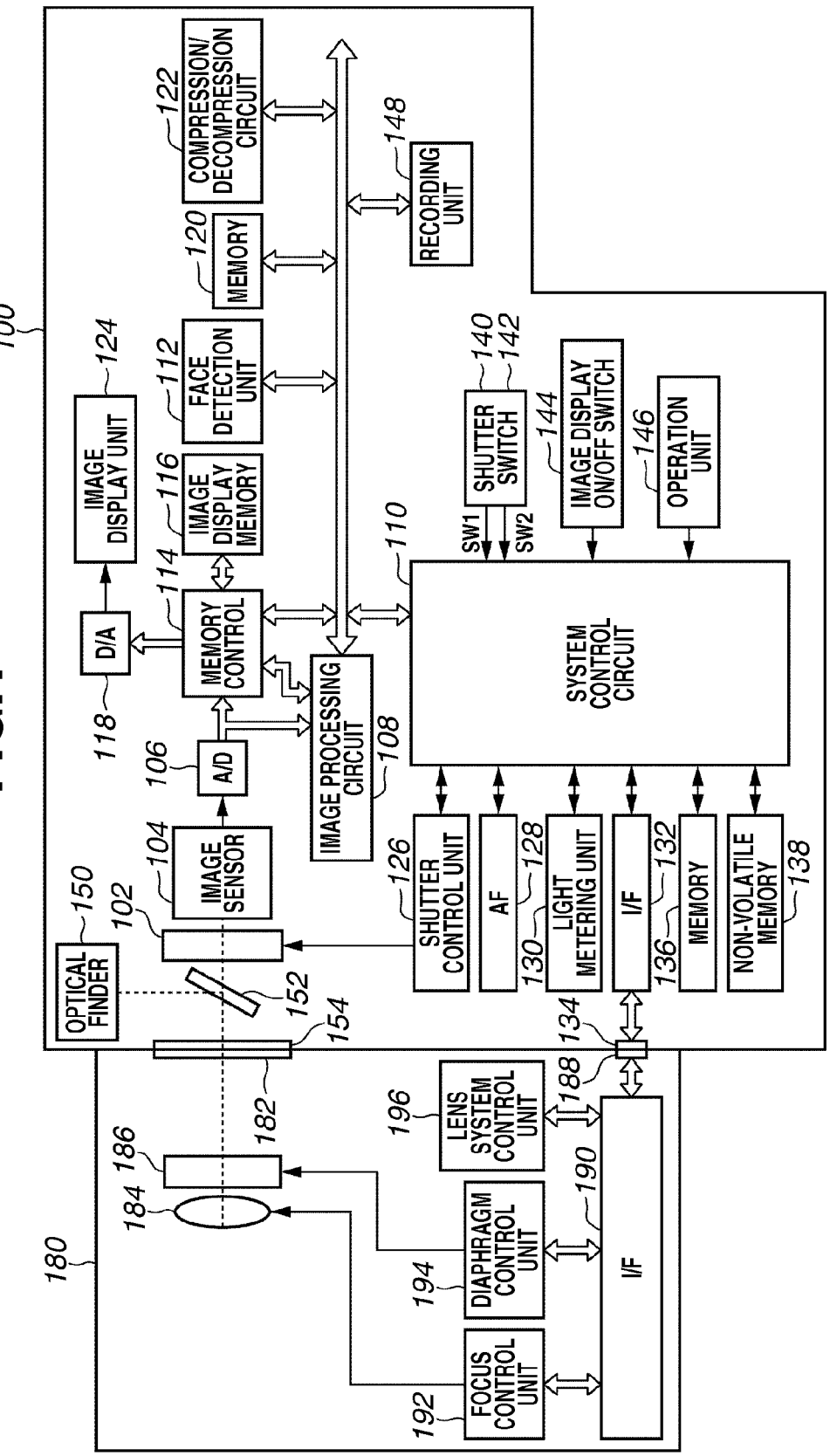
FIG. 1 is a block diagram illustrating a configuration of an imaging apparatus body and an imaging lens according to an embodiment of the invention.

FIG. 1 is a block diagram illustrating a configuration of an imaging apparatus according to an exemplary embodiment. The embodiment of the imaging apparatus illustrated in FIG. 1 has a configuration of a replaceable lens system in which a plurality of shooting lens units are replaceable. In other words, the imaging apparatus illustrated in FIG. 1 includes an imaging apparatus body 100 and a shooting lens unit 180 that is replaceably attached to the imaging apparatus body 100.

Referring to the embodiment shown in FIG. 1, the imaging apparatus body 100 will now be described.

The imaging apparatus body 100 includes a shutter 102, an image sensor 104, and an analog-to-digital (A/D) converter 106. The shutter 102 controls the exposure amount. The image sensor 104 receives an optical image transmitted through a lens 184 inside the shooting lens unit 180, and converts the image into an electric signal. The A/D converter 106 converts an analog signal output from the image sensor 104 into a digital signal (image data).

The imaging apparatus body 100 includes an image processing circuit 108, a system control circuit 110, a face detection unit 112 and a memory control circuit 114.

The image processing circuit 108 executes a predetermined pixel interpolation processing or a color conversion processing, to image data from the A/D converter 106 or image data from the memory control circuit 114. The image processing circuit 108 executes a predetermined calculation processing based on the image data. Further, the image processing circuit 108 executes an auto white balance (AWB) processing by the through the lens (TTL) system based on an obtained result of the calculation.

The system control circuit 110 controls the entire imaging apparatus. The system control circuit 110 controls an auto focus (AF) processing and an auto exposure (AE) processing, for a shutter control unit 126, a focus control unit 192 and a diaphragm control unit 194 in the shooting lens unit 180, as will be described later. This control is made based on the calculation result of the image processing circuit 108. The system control circuit 110 is one example of an area determination unit and a size determination unit.

The face detection unit 112 detects a target image included in the image data. In the present exemplary embodiment, the face detection unit 112 may detect a face of a person, as a target image. The face detection unit 112 is one example of a target image detection unit. The face detection unit 112 may execute predetermined face detection for image data from the image processing circuit 108 or image data from the memory control circuit 114.

The memory control circuit 114 controls the A/D converter 106, the image processing circuit 108, an image display memory 116, a digital-to-analog (D/A) converter 118, a memory 120 and a compression/decompression circuit 122. The memory control circuit 114 writes the image data processed by the image processing circuit 108 or the image data converted by the A/D converter 106 into the image display memory 116 or the memory 120.

The imaging apparatus body 100 includes an image display unit 124, the memory 120 and the compression/decompression circuit 122. The image display unit 124 may be, for example, a liquid crystal monitor, and may receive, through the D/A converter 118, the image data to be displayed that is written in the image display memory 116, and display the data. When the captured image data are displayed successively using the image display unit 124, an electronic finder function for displaying a subject in a real time moving image may be realized. In the image display unit 124, the displaying can be arbitrarily controlled to be ON/OFF in response to an instruction of the system control circuit 110.

The memory 120 is a storage unit for storing a captured still image or moving image. The memory 120 may have a sufficient storage amount for storing a predetermined number of still images and/or a predetermined time of the moving image. Thus, the memory control circuit 114 can write high-speed, large-capacity image data into the memory 120, in a continuous shooting for sequentially capturing a plurality of still images or panoramic shooting. The memory 120 can be used as a working area of the system control circuit 110.

The compression/decompression circuit 122 executes processing for compressing/decompressing the image data by adaptive discrete cosine transform. The compression/decompression circuit 122 reads the image data stored in the memory 120, compresses and decompresses the read data, and writes the processed image data in the memory 120.

The imaging apparatus body 100 includes the shutter control unit 126, an auto focus (AF) unit 128 and a light metering unit 130. The shutter control unit 126 controls the shutter 102 in cooperation with the diaphragm control unit 194, which can control a diaphragm 186 in the shooting lens unit 180 based on light metering information from the light metering unit 130.

The AF unit 128 executes auto focus controlling. The AF unit 128 introduces a light flux transmitted through the shooting lens unit 180 to the AF unit 128 via a camera mount 154, a mirror 152 and a sub-mirror for AF (not illustrated). The AF unit 128 measures an in-focus state of the shooting lens unit 180 on the image sensor 104. The system control circuit 110 may also execute the AF control for the focus control unit 192 of the shooting lens unit 180 based on the calculation result of the image data of the image sensor 104 by the image processing circuit 108. The AF control may also be achieved using the measurement result of the AF unit 128 and the calculation result of the image data of the image sensor 104 that is calculated by the image processing circuit 108.

The light metering unit 130 executes auto exposure (AE) processing. The light metering unit 130 introduces a light flux transmitted through the shooting lens unit 180 to the light metering unit 130 via the camera mount 154, the mirror 152 and a lens for light metering (not illustrated). The unit 130 measures an exposure state of an image. Similar to the AF unit 128, the system control circuit 110 may execute the AE control for the shutter control unit 126 and the diaphragm control unit 194 of the shooting lens unit 180 based on the calculation result of the image data of the image sensor 104.

The imaging apparatus body 100 includes an interface 132, a connector 134, a memory 136 and a non-volatile memory 138. The interface 132 electrically connects the imaging apparatus body 100 and the shooting lens unit 180.

The connector 134 has the function of sending/receiving a control signal, a state signal, and a data signal between the imaging apparatus body 100 and the shooting lens unit 180, and the function of supplying various voltages or currents. The connector 134 may be configured to carry out telecommunication, optical communication, and audio communication.

The memory 136 stores constants, variables, programs and the like for operations of the system control circuit 110.

The non-volatile memory 138 is an electrically erasable and recordable memory, and may be formed using, for example, an electrically erasable and programmable read only memory (EEPROM).

The imaging apparatus body 100 includes a shutter switch (SW1) 140, a shutter switch (SW2) 142, an image display ON/OFF switch 144, a quick review ON/OFF switch and an operation unit 146. These units are provided for the user to input various operation instructions to the system control circuit 110, and are configured with one or a combination of, for example, a switch, a dial, a touch panel, a pointing device operated by line-of-sight detection, and a speech recognition unit.

When a shutter button is half pressed, the shutter switch (SW1) 140 is turned ON and an instruction for starting, for example, AF processing, AE processing, auto white balance (AWB) processing and pre-flash (EF) processing is issued.

When the shutter button is fully pressed, the shutter switch (SW2) 142 is turned ON and an instruction for starting a series of processing for shooting is issued. The series of the processing for shooting can include exposure processing, developing processing, and recording processing. In the exposure processing, the imaging apparatus body 100 writes a signal read from the image sensor 104 into the memory 120 as image data through the A/D converter 106 and the memory control circuit 114. In the developing processing, developing is performed using calculations in the image processing circuit 108 or the memory control circuit 114. In the recording processing, the image data is read from the memory 120 and compressed by the compression/decompression circuit 122. Then, the recording unit 148 writes the image data on a recording medium such as a memory card and a hard disk.

The image display ON/OFF switch 144 can set the image display unit 124 to be turned ON/OFF. For example, a user may set the image display ON/OFF switch 144 to be turned OFF when the user shoots a subject using an optical finder 150. In this case, power supply to the image display unit 124 including a liquid crystal monitor is interrupted, and thus, an energy-saving effect is achieved.

The operation unit 146 includes various buttons and a touch panel. Those various buttons can include a menu button, a selecting/moving button, and an exposure correction button. Further, the operation unit 146 can include a focus position moving button for moving a focus lens position in a user-selected direction either to the closest distance side or to the infinite distance side.

The imaging apparatus body 100 includes the recording unit 148, the optical finder 150, the mirror 152, and the camera mount 154.

The recording unit 148 records the shot image data on a recording medium such as a memory card and a hard disk.

The optical finder 150 guides the light flux transmitted through the shooting lens unit 180 via the mirror 152. As a result, the user may be able to visibly recognize an optical image. Thus, the user can shoot a subject using only the optical finder 150 without using an electronic finder function with the image display unit 124.

The mirror 152 includes a semi-transmission part. While the semi-transmission part reflects the light flux transmitted through the shooting lens unit 180 on the optical finder 150, at the same time, the mirror 152 causes a part of a center of the light flux to transmit through the mirror, so as to guide the light flux to the AF unit 128 through a sub-mirror for AF. The mirror 152 may be, for example, a quick return mirror or a half mirror without a moving mechanism.

The camera mount 154 mechanically couples the shooting lens unit 180 and the imaging apparatus body 100. The camera mount 154 and a lens mount 182 of the shooting lens unit 180 are connected with each other, thus the shooting lens unit 180 can be attached to the imaging apparatus body 100.

Now, the shooting lens unit 180 will be described with reference to FIG. 1. The shooting lens unit 180 is a unit of a replaceable lens type and is attached to the imaging apparatus body 100. The shooting lens unit 180 includes the lens mount 182, the lens 184, the diaphragm 186, a connector 188 and an interface 190. The lens mount 182 mechanically connects the shooting lens unit 180 with the imaging apparatus body 100. The lens mount 182 and the camera mount 154 of the imaging apparatus body 100 are connected with each other, thus the shooting lens unit 180 is attached to the imaging apparatus body 100.

The lens 184 includes a focus lens which performs focus adjustment for the subject.

The interface 190 electrically connects the shooting lens unit 180 and the imaging apparatus body 100.

The connector 188 has the function of sending and receiving a control signal, a state signal and a data signal between the imaging apparatus body 100 and the shooting lens unit 180, and also the function of supplying and receiving various voltages or currents. The connector 188 may be configured to enable telecommunications, optical communications, and audio communications.

The shooting lens unit 180 includes the focus control unit 192, the diaphragm control unit 194, and a lens system controller 196. The focus control unit 192 controls a focus lens operation of the lens 184. The focus control unit 192 is one example of a focus control unit.

The diaphragm control unit 194 controls the diaphragm 186 in cooperation with the shutter control unit 126 controlling the shutter 102, based on light metering information from the light metering unit 130.

The lens system controller 196 controls the entire shooting lens unit 180. The lens system controller 196 includes a memory function for storing constants, variables and programs for operation of the shooting lens unit. In addition, the lens system controller 196 includes a non-volatile memory function for storing identification information such as a unique number of the shooting lens unit, management information, functional information such as a full aperture value, minimum aperture value, and a focal length, and current or past set values. The lens system controller 196 may include a function for calculating movement position information, as will be described later.

The configuration of the imaging apparatus according to the present exemplary embodiment has so far been described.

Operation of the imaging apparatus will now be described.

An example of an operation for detecting a target image will now be described with reference to the flowchart of FIG.

Figure 2:
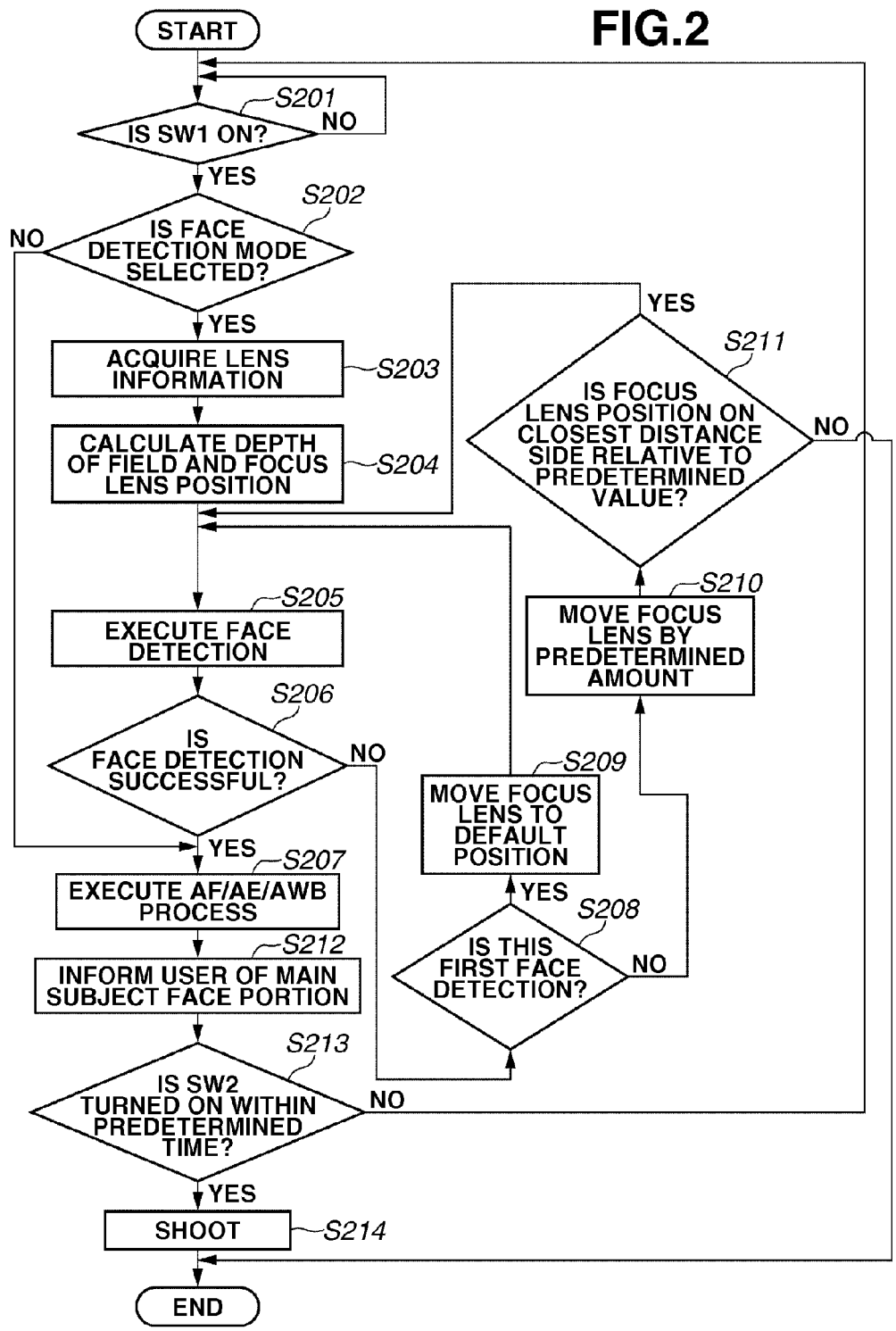
FIG. 2 is a flowchart illustrating an example of an operation for face detection according to an embodiment of the invention.

2. The flowchart in FIG. 2 illustrates an operation in a case (hereinafter referred to as a "live view time") where the image display unit 124 is used as an electronic finder. In this live view time, the mirror 152 may retract from a path of the light flux that transmits through the shooting lens unit 180 by a quick return mechanism. The following operation may be performed in an automatic shooting mode for automatically setting a function in the imaging apparatus. Further, in addition to the setting for the shooting mode, it may be possible to determine whether face detection is to be executed.

In step S201, the system control circuit 110 determines whether the user half presses the shutter button, i.e., whether the SW1 is turned ON. When the SW1 is not turned ON (NO in step S201), the system control circuit 110 waits until the SW1 is turned ON. When the SW1 is turned ON (YES in step S201), the process proceeds to step S202.

In step S202, the system control circuit 110 determines whether a setting for face detection (hereinafter referred to as a face detection mode) is selected. When face detection mode is selected (YES in step S202), the process proceeds to step S203. When the face detection mode is not selected (NO in step S202), the process proceeds to step S207.

In step S203, the system control circuit 110 reads various information (e.g., lens information) regarding the attached shooting lens unit 180. When acquiring lens information from the shooting lens unit 180, the system control circuit 110 communicates with the shooting lens unit 180 through the interface 132. The lens information includes lens unique information, a focal length, an aperture value, and a focus lens position.

In step S204, the system control circuit 110 calculates a depth of field and driving position of the focus lens for face detection based on the various information of the attached shooting lens unit 180. The driving position of the focus lens corresponds to a plurality of positions that have been divided into appropriate steps for face detection in a range from the closest distance side to the infinite distance side, as will be specifically described below.

Now, calculations of the depth of field will be described. The depth of field d for face detection is basically a result of addition of a front depth of field $d_f$ and a back depth of field $d_b$. The front depth of field $d_f$ is the frontward depth of field of the subject seen from the lens side. The back depth of field $d_b$ is the backward depth of field of the subject seen from the lens side. The depths of field can be calculated by the following equations (1), (2) and (3).

$$d_f = \delta \times F \times x^2 / (f^2 + \delta \times F \times x) \quad (1)$$

$$d_b = \delta \times F \times x^2 / (f^2 - \delta \times F \times x) \quad (2)$$

$$d = k \times (d_f + d_b) \quad (3)$$

Wherein $\delta$ is a permissible circle of confusion, F is an aperture value, x is a subject distance, f is a focal length, k is a coefficient for face detection. The permissible circle of confusion depends on the cell pitch of the image sensor 104, and is calculated based on the size and number of pixels of the image sensor 104. The value of the permissible circle of confusion is stored in advance in the non-volatile memory 138, and the calculated depth of field and the driving position of the focus lens are stored also in the non-volatile memory 138. The focal length and aperture value depend on the type of the attached shooting lens unit 180. Thus, the system control circuit 110 calculates the depth of field and the driving position of the focus lens according to the type of the shooting lens unit 180.

In step S205, the face detection unit 112 acquires image data from the image sensor 104 to detect a target image from the acquired image data. In the present exemplary embodiment, descriptions will be made with regard to a case where the face of the subject is detected as a target image. The face detection unit 112 detects the face at first in the current focus lens position, regardless of the calculated result in step S204. In this case, a face detection operation such as a well-known face detection operation can be employed. Alternatively, according to one example of the face detection operation, the form of the subject is compared with a previously stored predetermined form based on a pattern matching method. For example, the face detection unit 112 clips a partial image in a plurality of different positions on the image and determines whether the clipped partial image satisfies the form of the face, thereby detecting the face area on the image. A determination whether the partial image corresponds to the face area can be made according to a template matching method or an identifier which has acquired features of faces based on a neural network learning method.

In step S206, the system control circuit 110 makes a determination based on the result of the face detection executed in step S205. That is, the system control circuit 110 determines whether the face detection result satisfies a criterion for determining that the face has successfully been detected. More specifically, when the face detection has succeeded, the criterion is satisfied. When the face detection has not succeeded, the criterion is not satisfied.

When the face detection has succeeded (YES in step S206), the process proceeds to step S207. When it is determined that the face detection has not succeeded (NO in step S206), the face detection unit 112 determines that there is no human face in the depth of field in the current focus lens position and the process proceeds to step S208. In step S208, the face detection unit 112 determines whether the face detection is being executed for the first time. If it is determined that the face detection is being executed for the first time (YES in step S208), the flow proceeds to step S209. In step S209, the face detection unit 112 moves the focus lens to a default position and proceeds to perform face detection processing again, i.e., processing returns to step S205.

In step S207, the system control circuit 110 controls AF processing and AE processing in a predetermined area via the AF unit 128 and the light metering unit 130. This predetermined area corresponds to a plurality of range-finding areas that are fixed in advance in the image frame, when it is determined that the face detection mode has not been selected in step S202. By contrast, this predetermined area corresponds to the detected face area, when it is determined that the face detection has succeeded in step S206. Accordingly, the face detection operation immediately ends upon successful face detection, thus reducing time for face detection.

The image processing circuit 108 executes the AWB processing of the TTL system based on the finally acquired image data. To operate the AF unit 128 and the light metering unit 130, the system control circuit 110 once stops the live view and operates the quick return mechanism. The system control circuit 110 moves the mirror 152 to a predetermined position in the shooting light flux only within the time of the AF processing and the AE processing. After the processing, the system control circuit 110 immediately retracts the mirror 152.

As described above, the system control circuit 110 may execute the AF control and the AE control for the focus control unit 192 and the diaphragm control unit 194 of the shooting lens unit 180 based on a calculation result of the image data of the image sensor 104. The image data is calculated by the image processing circuit 108. In this case, the system control circuit 110 may keep retracting the mirror 152 outside the shooting light flux. Descriptions about the AF processing, the AE processing and the AWB processing are omitted.

In step S208, the system control circuit 110 determines whether the face detection processing is executed for the first time after SW1 turns ON. When the face detection processing is executed for the first time (YES in step S208), the process proceeds to step S209. When the face detection processing is executed for the second time or more (NO in step S208), the process proceeds to step S210.

In step S209, since the face detection has not succeeded in the depth of field in an initial focus position, the system control circuit 110 instructs the focus control unit 192 to move the focus lens position of the shooting lens unit 180 to a default position. In the present exemplary embodiment, the default position is set on the closest distance side and is acquired by the system control circuit 110 in advance in step S204.

In the face detection for the second time or more, the face detection unit 112 proceeds to step S210 if face detection has not succeeded in the depth of field in its corresponding focus lens position. In step S210, the system control circuit 110 instructs the focus control unit 192 to move the focus lens position to the infinite distance side by a predetermined amount. This predetermined amount is calculated in advance by the system control circuit 110 in step S204.

In step S211, the system control circuit 110 determines whether the focus lens position is on the closest distance side as compared with a predetermined value. When the focus lens position is on the closest distance side (YES in step S211), the process returns to step S205. When the focus lens position is not on the closest distance side (NO in step S211), the system control circuit 110 ends the face detection operation. When the processing of this step S211 is performed, it is possible to prevent the face detection from being infinitely performed, even if the face detection has not succeeded in a range from the closest distance side to the infinite distance side. Thus, when the focus lens position is not on the closest distance side as compared with a previously set predetermined value, the face of the subject is not successfully detected as a result of search from the closest distance side to the infinite distance side. Therefore, the system control circuit 110 ends the face detection operation. At this time, the system control circuit 110 displays a warning on the image display unit 124 to inform the user that the face detection has not succeeded.

Accordingly, in the face detection according to the present exemplary embodiment, when the face detection has not succeeded in the initial focus lens position, the system control circuit 110 drives the focus lens position to a default position on the closest distance side using the focus control unit 192, and the face detection unit 112 executes face detection.

After that, while the focus control unit 192 moves the focus lens position to the infinite distance side by a predetermined amount, the face detection unit 112 sequentially executes the face detection to search for the face up to a previously set predetermined value on the infinite distance side. When the face detection unit 112 sequentially detects the face, if the face detection has succeeded, the face detection is immediately ended and the next processing is executed. Thus, the imaging apparatus can quickly and reliably execute the face detection.

In step S212, the system control circuit 110 displays on the image display unit 124 the image data on which the AF processing, the AE processing and the AWB processing were performed in step S206. The system control circuit 110 displays, for example, a red square frame superimposed on the face part of the main subject that is detected in step S205, thereby informing the user of the face part of the main subject.

In step S213, the system control circuit 110 determines whether the user fully presses the shutter button within a predetermined time, i.e., whether the SW2 is turned ON. If the SW2 is turned ON (YES in step S213), the process proceeds to step S214 to execute the shooting processing. If the SW2 is not turned ON within a predetermined time (NO in step S213), the process returns to step S201 to repeat the face detection.

For the sake of clear understanding of the flow chart illustrated in FIG. 2, an example of the relationship between the subject distance, the depth of field in relation to the face detection and the face detection timing will now be described with reference to FIG. 3. As described in the flowchart illustrated in FIG. 2, in the actual operation, the face detection is executed by controlling focus of the shooting lens unit 180. For the sake of clear understanding of FIG. 3, the focus lens position is converted to the distance on the side of the subject.

Figure 3:
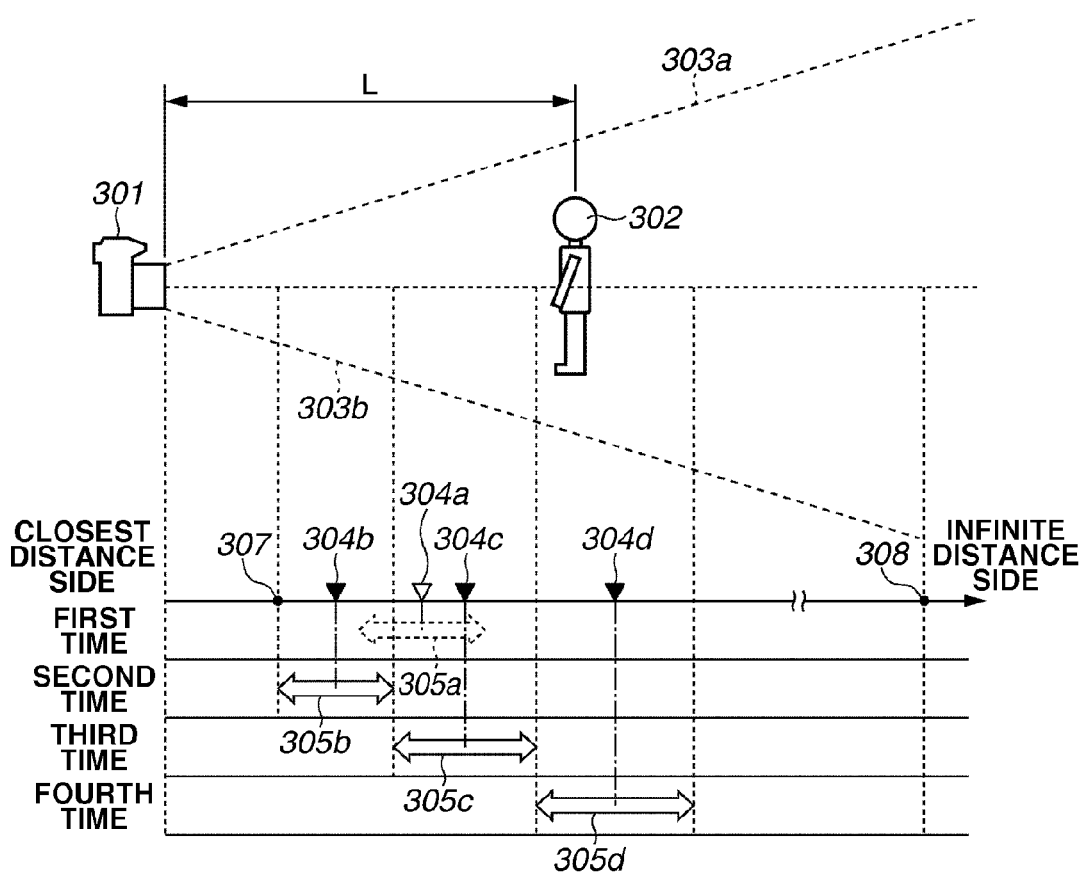
FIG. 3 is a schematic diagram illustrating an example of a relationship among a subject distance, a depth of field, and face detection timing.

A camera 301 illustrated in FIG. 3 includes the imaging apparatus 100 and the shooting lens unit 180 illustrated in FIG. 1. A person 302 as a main subject is positioned at a distance L from the front of the camera 301. In FIG. 3, reference numerals 303a and 303b denote a shooting angle of view. Here, the person 302 is positioned in the shooting angle of view.

In FIG. 3, reference numerals 304a, 304b, 304c and 304d denote subject distance positions that are obtained by calculating and converting the focus lens positions of the shooting lens unit 180 to distances on the subject side when the face detection is executed according to the flowchart of FIG. 2 in the state of FIG. 3. Arrows 305a, 305b, 305c and 305d denote the depths of field corresponding to the respective subject distance positions.

Assume that the reference numeral 304a denotes the subject distance corresponding to the current focus lens position before starting the face detection operation. At this time, the depth of field 305a corresponds to the current focus lens position. Thus, as described in step S205 of the flowchart illustrated in FIG. 2, the face detection unit 112 executes the first face detection in its focus lens position. That is, the depth of field 305a corresponds to a subject distance range for performing the face detection for the first time.

However, as illustrated in FIG. 3, this range does not include the face of the person 302. Thus, as described in step S209, the focus control unit 192 moves the focus lens position to a default position on the closest distance side, which corresponds to the subject distance 304b in the figure. At this time, the depth of field 305b corresponds into the default position on the closest distance side. The focus lens position is calculated in step S204 so that the subject distance 307 on the closest distance side of the depth of field 305b is set as the estimated closest distance at the time of shooting a person with the shooting lens unit 180. The face detection unit 112 executes the second face detection in this depth of field 305b.

As illustrated in FIG. 3, this range does not include the face of the person 302. Thus, as described in step S210, the focus control unit 192 moves the focus lens position to the infinite distance side by a predetermined amount, which corresponds to the subject distance 304c in the figure. At this time, this depth of field 305c corresponds to the subject distance 304c. In this case, the last depth of field 305b coincides with this depth of field 305c almost on the infinite distance side of the depth of field 305b and the closest distance side of the depth of field 305c. The system control circuit 110 calculates the focus lens position in which boundaries of adjacent depths of field almost coincide with each other in step S204. The face detection unit 112 executes the face detection in this depth of field 305c for the third time.

In the present exemplary embodiment, the focus lens position is set such that the infinite distance side of the depth of field 305b almost coincides with the closest distance side of the depth of field 305c. However, the focus lens position may be set such that the infinite distance side of the depth of field 305b and the closest distance side of the depth of field 305c may overlap each other to some extent. As a result of this, the face of the person can reliably be detected.

However, as illustrated in FIG. 3, this range does not include the face of the person 302. Thus, as described in step S210, the focus control unit 192 moves the focus lens position to the infinite distance side by a predetermined amount, which corresponds to the subject distance 304d in the figure. At this time, the depth of field 305d corresponds to the subject distance 304d. Similar to the last case, the focus control unit 192 moves the focus lens position to the focus lens position in which the most appropriate depth of field has been set. The face detection unit 112 executes the face detection in this depth of field 305d for the fourth time.

As illustrated in FIG. 3, the face detection unit 112 can execute the face detection for the person 302 in this range. Thus, the system control circuit 110 ends the face detection operation and executes the processing in step S207 thereafter in the flowchart illustrated in FIG. 2.

The subject distance 308 on the infinite distance side shows a distance limit of the face detection search range. As described in step S211, the face detection unit 112 determines whether the subject is on the closest distance side as compared with the limit position. When the subject is on the closest distance side, the face detection is not executed. That is, the face detection search range of the camera 301 is from the subject distance 307 to the subject distance 308. Thus, quick and reliable face detection is realized in a range from the closest distance side to the infinite distance side.

In the above-described descriptions, the system control circuit 110 acquires information regarding the shooting lens unit 180 when the SW1 is turned ON. However, the present invention is not limited to this case. For example, when the shooting lens unit 180 is attached to the imaging apparatus body 100, the system control circuit 110 may immediately perform communications through the interface 132 to acquire the lens information.

The F-number of the shooting lens unit may be fixed during the face detection because it may influence the depth of field. That is, the predetermined amount by which the focus lens position is moved is calculated based on the depth of field using the F-number in the face detection. When the F-number is to be allowed to vary, it may be necessary to acquire the lens information through communication with the shooting lens unit 180 every time face detection is executed. The same applies to the zooming operation of the shooting lens unit, i.e., a focal length change.

In the above-described descriptions, when the shutter button is not fully pressed within a predetermined time, and when the SW2 is not turned ON, the face detection unit 112 has executed the face detection again. However, the present invention is not limited to this case. For example, while the shutter button is half pressed and the SW1 is turned ON, the face detection may not be executed again.

In the above descriptions, when the face detection mode is selected, the face detection unit 112 executes the face detection only when the shutter button is half pressed and the SW1 is turned on. However, the present invention is not limited to this case. For example, in the live view time, the face detection unit 112 may not be limited to the face detection that is executed only when the SW1 is turned ON. The face detection may automatically be executed at predetermined intervals. When the focus lens is moved to perform the face detection, the focus is also moved in the image of the live view and a displayed image is unclear. Therefore, during the live view time, the face detection may be executed without moving the focus lens position.

In the above-described descriptions, the automatic shooting mode is set. However, the present invention is not limited to this case and any other shooting mode may be employed, for example as long as the face detection is effectively executed. In a shooting mode not involving the face detection, e.g., a macro shooting mode, a scene shooting mode, it may be set that the face detection is not executed even when the face detection mode is selected.

The above descriptions are given about the replaceable lens system in which a plurality of shooting lens units are replaceable. However, the present invention is not limited to this. For example, the present invention may be applicable to an imaging apparatus integrating the imaging apparatus body 100 and the shooting lens unit 180.

In the above descriptions, the face detection unit 112 has a function for detecting the face of a person(s). However, the present invention is not limited to this case, and the face detection unit 112 may also have a function for identifying the individuals or their facial expressions. More specifically, the determination criterion of the face detection result in step S206 may be whether a specific individual's face has been detected, or whether an individual's face having a specific facial expression, e.g., a smiling face has been detected.

According to the present exemplary embodiment, the face is searched from the closest distance side to the infinite distance side according to the depth of field of the shooting lens unit, without executing the face detection for a predetermined number of times. When the face detection has not succeeded, the focus lens position is moved to execute the face detection operation. When the face detection has succeeded, the face detection operation is ended immediately. This prevents incomplete detection of the face and reduces the time for the face detection. Accordingly, aspects of the invention provide an imaging apparatus which can detect a face of a subject in an entire distance range in which focusing can be done, from the closest distance end to the infinite distance end even in a shallow depth of field, and can reduce the time for face detection.

The first exemplary embodiment uses an algorithm taking a so-called closest priority mode. In this mode, the face is searched from the closest distance side, and the face detection is ended immediately after the face is detected. In the second exemplary embodiment, processing for estimating the main subject among a plurality of persons is added. The main operation in the imaging apparatus is similar to the flowchart illustrated in FIG. 2. In the present exemplary embodiment, the imaging apparatus detects the face of a person that is a main subject as a predetermined target image in processing for making judgments about the face detection result in step S206 of the flowchart illustrated in FIG. 2.

Figure 4:
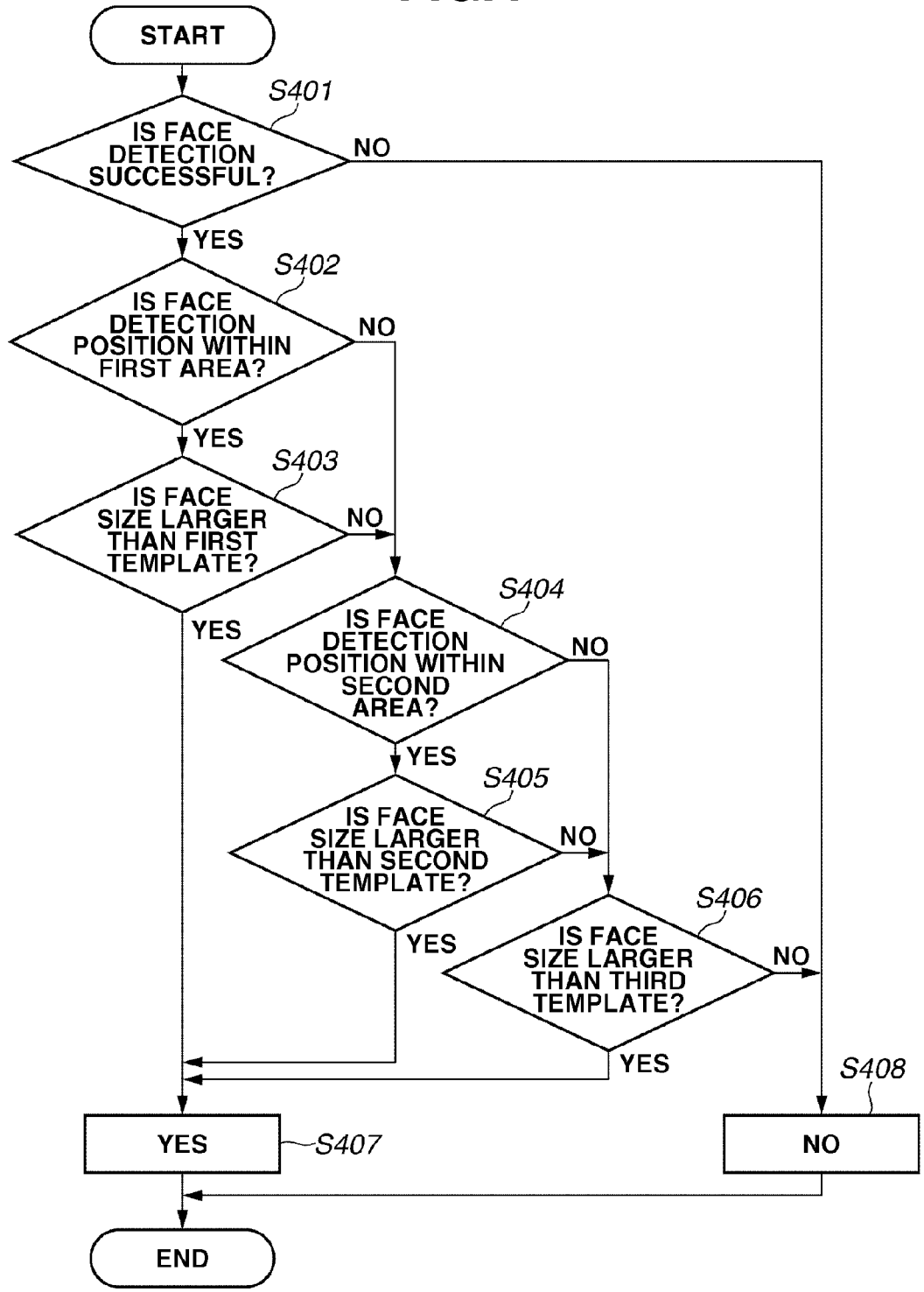
FIG. 4 is a flowchart illustrating an example of an operation for estimating a main subject, according to a second exemplary embodiment.

FIG. 4 is a flowchart for an example of estimating the main subject in step S206 of the flowchart illustrated in FIG. 2.

In step S401, the system control circuit 110 determines whether the face detection has succeeded. When the face detection has succeeded (YES in step S401), the system control circuit 110 proceeds to step S402. When the face detection has not succeeded (NO in step S401), the circuit proceeds to step S408. In the first exemplary embodiment, the face detection result has been determined based only on the processing corresponding to step S401. However, the imaging apparatus according to the present exemplary embodiment estimates the main subject through steps S402 to S406.

Figure 5:
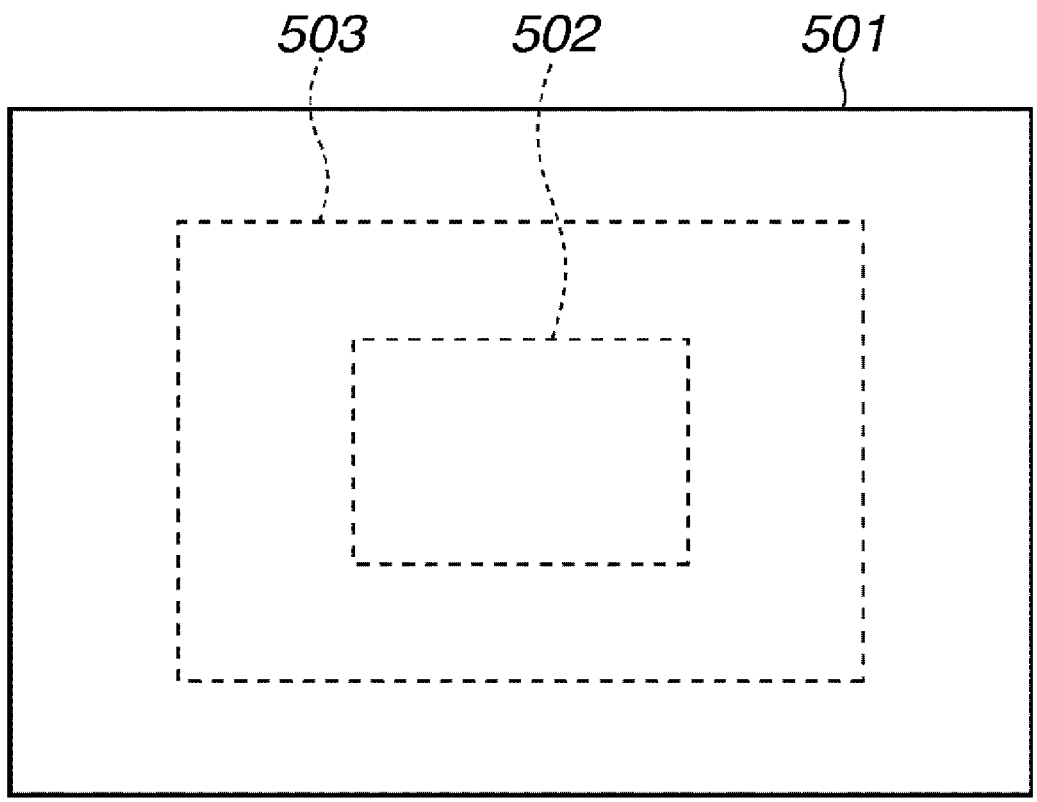
FIG. 5 is an example diagram for describing an area within an image frame.

In step S402, the system control circuit 110 determines whether the position of the face detected by the face detection unit 112 is within a first area in the image frame. More specifically, the system control circuit 110 determines whether the detected face is within a predetermined area in the photographic image. The area within the image frame will now be described with reference to FIG. 5. FIG. 5 illustrates an image frame range 501. The image frame range 501 includes a first area 502 around the center and a second area 503 that is a size larger than the first area 502. In step S402, the system control circuit 110 determines whether the position of the detected face in the image frame 501 is in the first area 502. When the position is in the first area 502 (YES in step S402), the process proceeds to step S403. When the position is not in the first area 502 (NO in step S402), the process proceeds to step S404. The position of the face may be based on the center of gravity in the range of the detected face, or may be based on the position of the eyes.

In step S403, the system control circuit 110 determines whether the size of the detected face is larger than the first template stored in advance in the non-volatile memory 138. The system control circuit 110 determines whether the detected face is larger than a predetermined size. Those templates to be compared with the detected face will now be described with reference to FIGS. 6A to 6C.

Figure 6A:
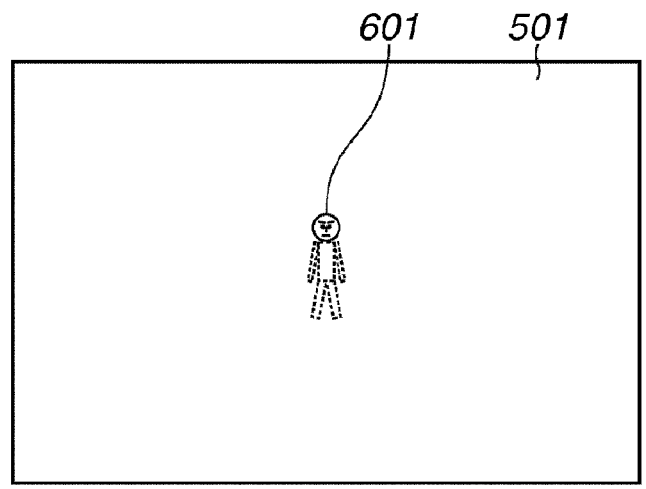
FIGS. 6A to 6C are example diagrams each for describing the size of a template corresponding to the size of the image frame.
Figure 6B:
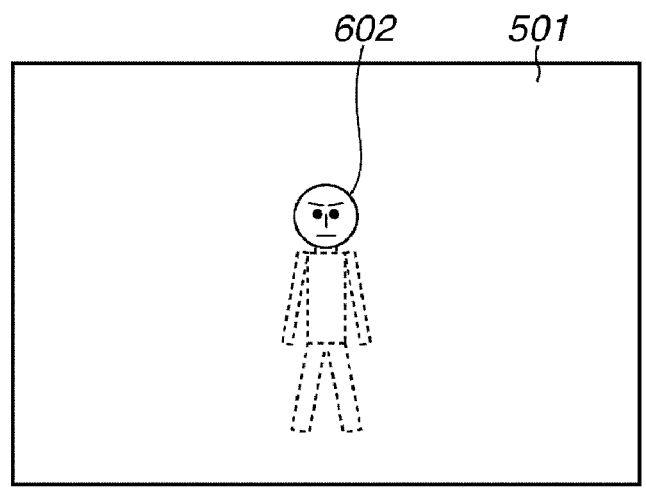
Figure 6C:
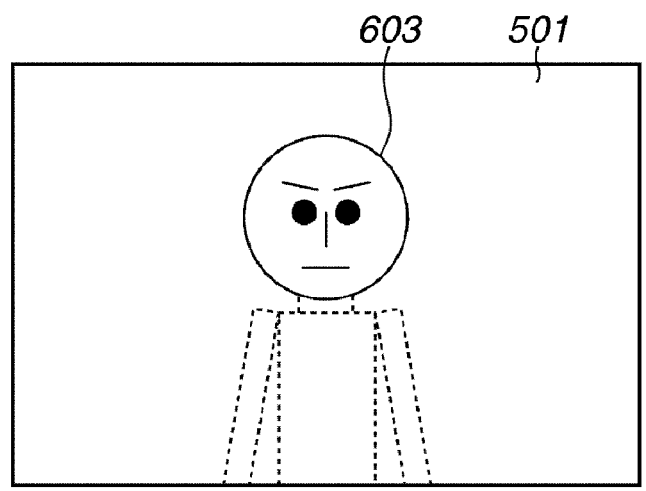

Each of FIGS. 6A to 6C illustrates a template as a reference size of the image frame 501. In this case, the "template" refers to the size of the face. FIG. 6A illustrates a first template 601. FIG. 6B illustrates a second template 602. FIG. 6C illustrates a third template 603. These templates are stored in advance in the non-volatile memory 138.

As reference sizes of the image frame 501, the first template 601 is smaller than the third template 603. More specifically, the following relation exists between the templates: first template 601<second template 602<third template 603. In each of the templates 601, 602 and 603, the body part in relation to the size of the face is indicated by dotted line.

In step S403, the system control circuit 110 determines whether the size of the face detected by the face detection unit 112 is larger than the first template 601. When the detected face is larger than the first template (YES in step S403), the process proceeds to step S407. When the detected face is not larger than the first template (No in step S403), the process proceeds to step S404.

In step S404, the system control circuit 110 determines whether the position of the face detected by the face detection unit 112 in the image frame is in the second area 503. When the position of the face is in the second area 503 (YES in step S404), the process proceeds to step S405. When the position of the face is not in the second area 503 (NO in step S404), the process proceeds to step S406.

In step S405, the system control circuit 110 determines whether the size of the face detected by the face detection unit 112 is larger than the second template 602. When the size of the detected face is larger than the second template 602 (YES in step S405), the process proceeds to step S407. When the size of the detected face is not larger than the second template 602 (NO in step S405), the process proceeds to step S406.

In step S406, the system control circuit 110 determines whether the size of the face detected by the face detection unit 112 is larger than the third template 603. When the size of the detected face is larger than the third template 603 (YES in step S406), the process proceeds to step S407. When the size of the detected face is not larger than the third template 603 (NO in step S406), the process proceeds to step S408.

Finally, in step S407, the system control circuit 110 determines that the face detected as a target in steps S402 to S406 is the main subject, and sends "Yes". In step S408, the system control circuit 110 determines that the face detection has not succeeded or that the detected face is not the main subject, and sends "No".

Based on this determination processing, in the present exemplary embodiment, even when there is a plurality of faces in the frame, it is possible to find the main subject fairly quickly and reliably. In the above descriptions, the face of the person is considered to have been found as the main subject, in the two steps of: determining whether the detected face is in a predetermined area of the photographic image; and determining whether the detected face is larger than a predetermined size. However, the present invention is not limited to this case. The face of the person as the main subject may be considered to have been found in any one of the determination steps.

Figure 7:
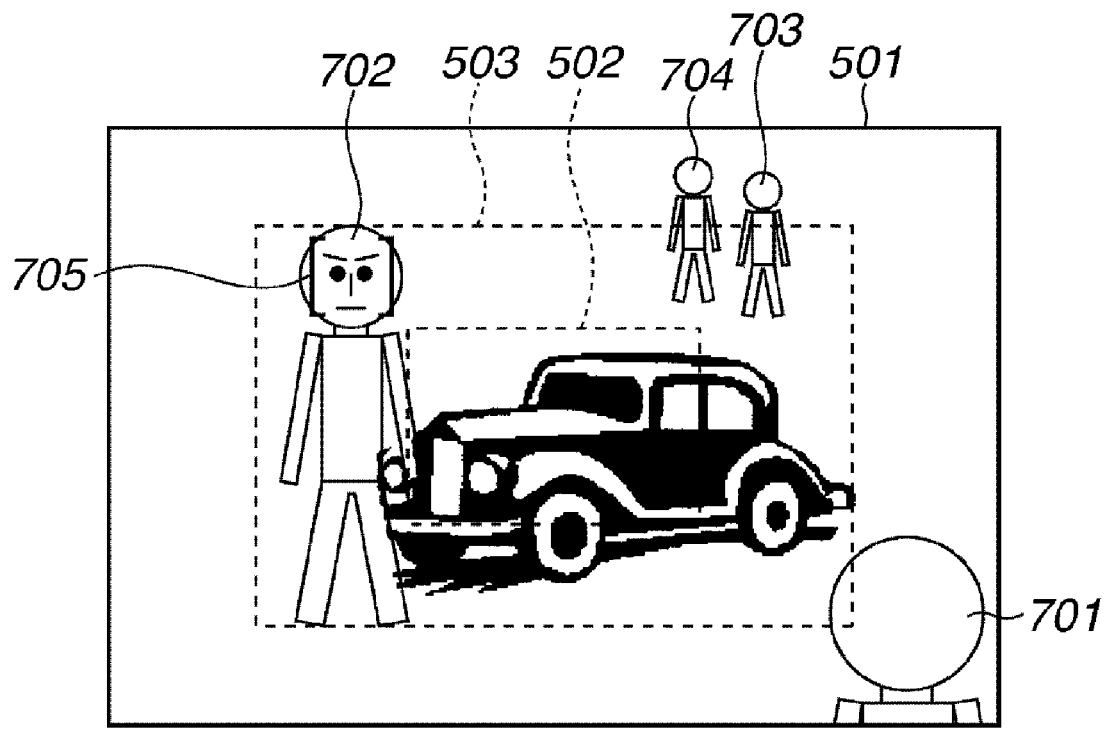
FIG. 7 is an example diagram illustrating a live view image displayed when there is a plurality of persons in the image frame.
Figure 8:
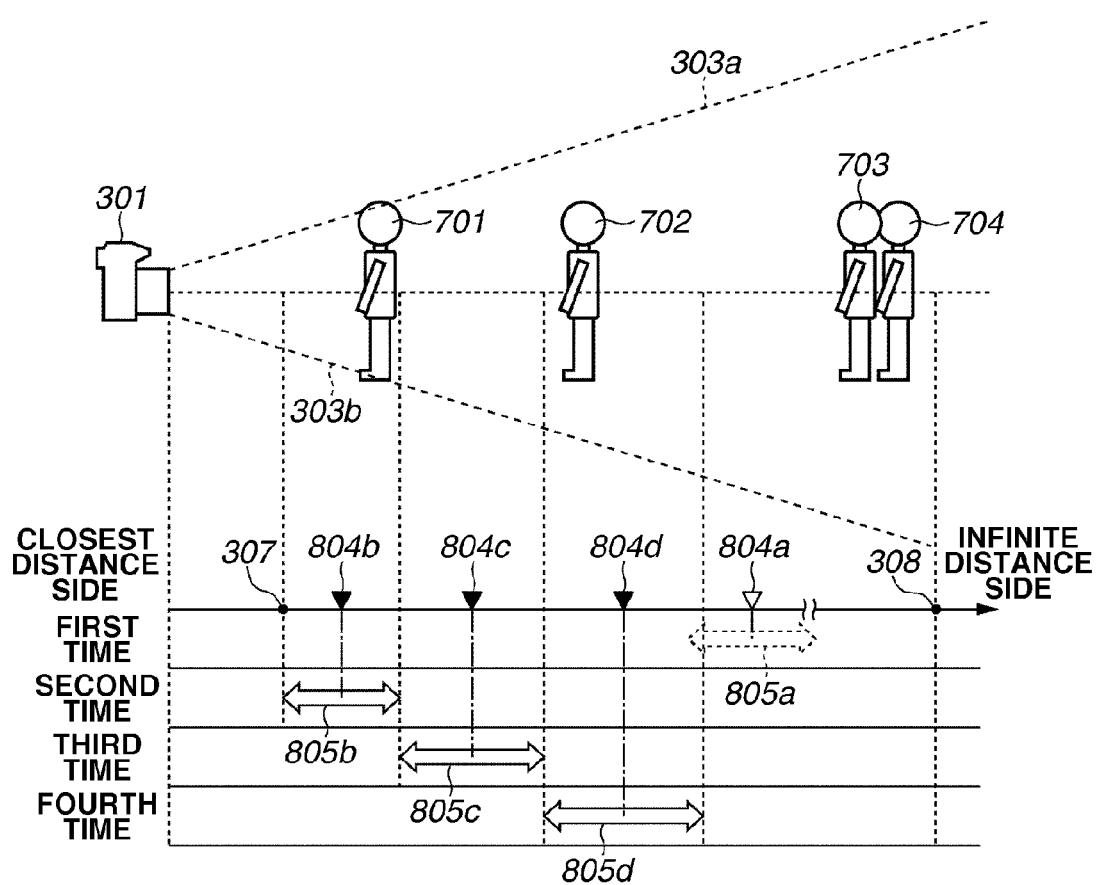
FIG. 8 is a schematic diagram illustrating an example of a relationship among a subject distance, a depth of field and face detection timing, according to the second exemplary embodiment.

Descriptions will now be made about the above determination when there are a plurality of persons in the image frame 501 with reference to FIG. 7 and FIG. 8. FIG. 7 is a diagram illustrating an example of a live view image displayed on the image display unit 124. FIG. 8 is a diagram illustrating an example of the relationship among the subject distance of the person illustrated in FIG. 7, the depth of field and the face detection timing. Operations in the flowchart illustrated in FIG. 4 will now be described with reference to these illustrations.

Four persons 701, 702, 703 and 704 appear in the image frame 501 illustrated in FIG. 7. At this time, the main subject is the person 702, who is in a picture with a car. The person 701 on the closest distance side and the persons 703 and 704 on the infinite distance side are shown in the image. However, as a result of the face detection of the present exemplary embodiment, the main subject, e.g., person 702 has accurately been detected. More specifically, the shooting lens unit 180 is focused on the person 702. A frame line 705 is shown on the detected face of the person 702.

FIG. 8 illustrates the persons 701, 702, 703 and 704 illustrated in FIG. 7 in the order of subject distance from the camera 301. Operational processing for detecting the face of the person 702 will now be described as the main subject illustrated in FIG. 7 with reference to FIG. 8. For the sake of clear understanding, the focus lens position is converted to the subject distance in FIG. 7.

In FIG. 8, reference numerals 804a, 804b, 804c and 804d denote subject distance positions that are obtained by calculating and converting the focus lens position of the shooting lens unit 100 to the distances on the subject side when the face detection by the flowchart in FIG. 4 is applied to the image frame in FIG. 7. Arrows 805a, 805b, 805c and 805d denote depths of field corresponding to the respective subject distance positions.

The reference numeral 804a denotes the subject distance corresponding to the current focus lens position before starting the face detection operation. At this time, the depth of field 805a corresponds to this focus lens position.

As described in FIG. 2, the first face detection is executed in the focus lens position. Thus, the depth of field 805a corresponds to a subject distance range for executing the first face detection.

As illustrated in FIG. 8, there is no face of a person in this range. Thus, the focus control unit 192 moves the focus lens position to a default position on the closest distance side to be set as the subject distance 804b in the figure. At this time, the depth of field 805*b* corresponds to the default position. The face detection unit 112 executes the second face detection in the depth of field 805*b*.

The face detection unit 112 can detect the face of the person 701 in this range as illustrated in FIG. 8. Thus, the system control circuit 110 executes the processing from step S402 and thereafter in the flowchart illustrated in FIG. 4.

In step S402, the system control circuit 110 determines that the face of the person 701 is not in the first area 502 (NO in step S402), and thus the process proceeds to step S404. In step S404, the system control circuit 110 also determines that the face of the person 701 is not in the second area 503 (NO in step S404), and thus the process proceeds to step S406.

In step S406, the system control circuit 110 determines that the size of the detected face of the person 701 is not larger than the third template 603 (NO in step S406), and thus the process proceeds to step S408. In step S408, the system control circuit 110 determines "No" as the result of the face detection.

Therefore, the focus control unit 192 now moves the focus lens position to the infinite distance side by a predetermined amount to be set as the subject distance 804*c* illustrated in FIG. 8. At this time, the depth of field 805*c* corresponds to the subject distance 804*c*. The face detection unit 112 executes the face detection in this depth of field 805*c* for the third time.

However, as illustrated in FIG. 8, since this range does not include the face of the person, the focus control unit 192 moves the focus lens position to the infinite distance side by a predetermined amount to be set as the subject distance 804*d* in the figure. At this time, the depth of field 805*d* corresponds to the subject distance 804*d*. The face detection unit 112 executes the face detection in this depth of field 805*d* for the fourth time.

As illustrated in FIG. 8, the face detection unit 112 can detect the face of the person 702 in this range. Thus, the system control circuit 110 executes the processing from step S402 and hereafter in the flowchart illustrated in FIG. 4.

In step S402, the system control circuit 110 determines that the face of the person 702 is not in the first area 502, and thus the process proceeds to step S404. In step S404, the system control circuit 110 determines that the face of the person 702 is in the second area 503, and thus the process proceeds to step S405.

In step S405, the system control circuit 110 determines that the size of the detected face of the person 702 is larger than the second template 602, and thus the process proceeds to step S407. In step S407, the system control circuit 110 determines "Yes" as the result of the face detection.

The system control circuit 110 ends the face detection operation, selects the person 702 as a main subject, and proceeds to the processing from step S207 and thereafter in the flowchart illustrated in FIG. 2.

By executing the above processing, the system control circuit 110 can display a live view image illustrated in FIG. 7. More specifically, in FIG. 7, the system control circuit 110 can accurately detect the person 702 as the main subject. Thus, the shooting lens unit 180 is focused on the person 702 and appropriate exposure is obtained. The system control circuit 110 displays the frame line 705 in a part where the face has been detected. Except the person 702, the persons 701, 703 and 704 may be out of focus.

In the first exemplary embodiment and the second exemplary embodiment, the face detection unit 112 detects the target image. However, the system control circuit 110 may also detect the target image.

In the above descriptions, the system control circuit 110 determines the result of the face detection, determines whether the detected face is in a predetermined area in the photographic image, and whether the detected face is larger than a predetermined size. However, the present invention is not limited to these cases. For example, the face detection unit 112 may also make those determinations.

According to the present exemplary embodiment, the main subject is found by searching from the closest distance side to the infinite distance side according to the depth of field of the shooting lens unit. In addition, the face detection operation is ended immediately when the face detection has succeeded. Thus, the face detection can quickly and reliably be executed.

In the above descriptions of the present exemplary embodiment, the main subject is found using parameters such as the position and size of the face. However, the present invention is not limited to this case. For example, the imaging apparatus may also store the features of the face of the subject in advance to recognize the main subject.

The first exemplary embodiment and the second exemplary embodiment use an algorithm for ending the face detection when the face is detected and keeping the face detection while moving the focus lens position when the face cannot be detected. In the third exemplary embodiment, when moving the focus lens position, processing in which the user can instruct a direction of the lens position, is added.

Figure 9:
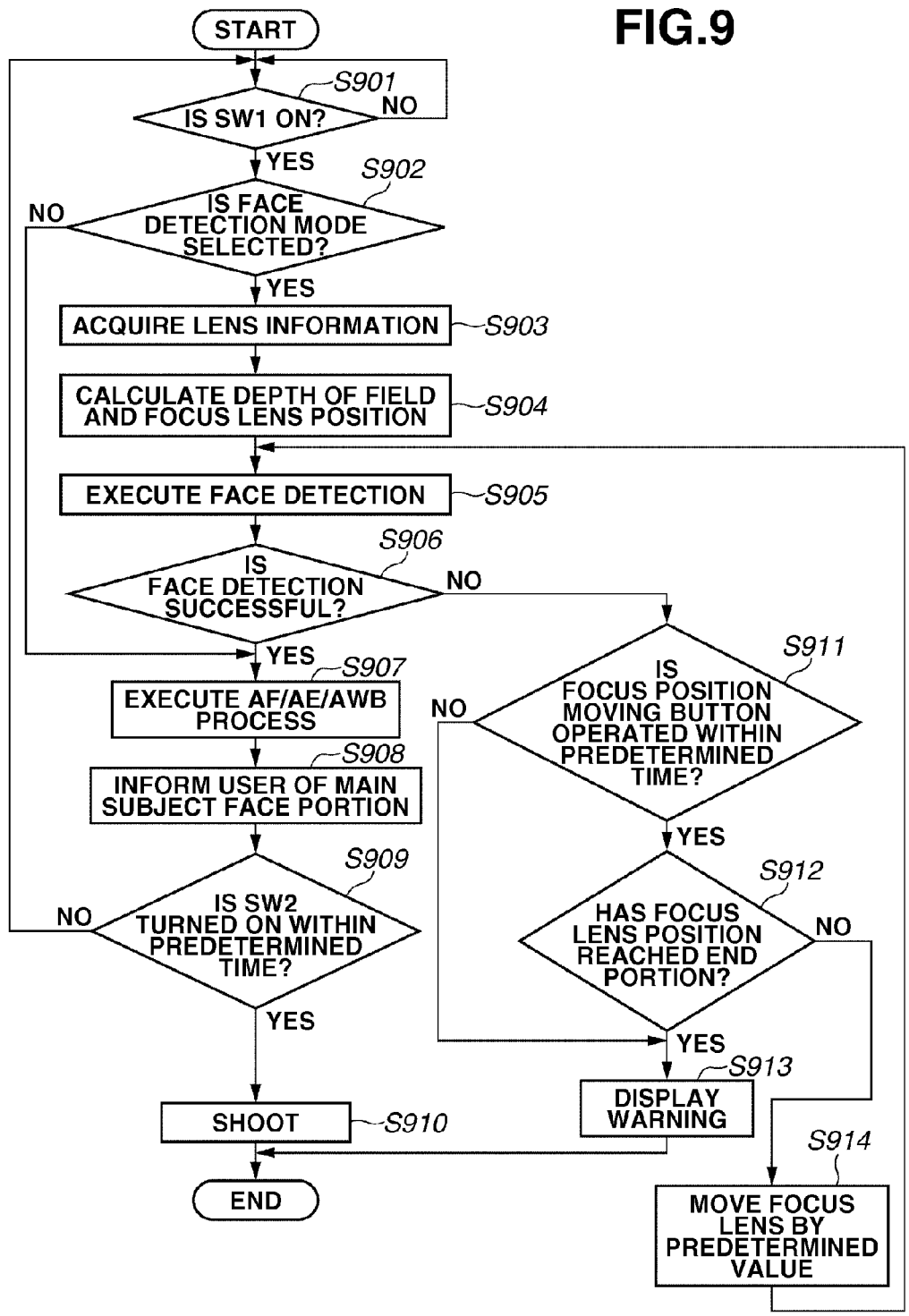
FIG. 9 is a flowchart illustrating an example of an operation for face detection, according to a third exemplary embodiment.

In the present exemplary embodiment, an example of an operation for detecting a target image will be described with reference to the flowchart of FIG. 9. The processing from steps S201 to S207 in FIG. 2 are similar to the processing from steps S901 to S907 in FIG. 9, and the processing from steps S212 to S214 in FIG. 2 are similar to the processing from steps S908 to S910 in FIG. 9. The processing from steps S911 to S914 in FIG. 9 is the features of the present exemplary embodiment, and so will be mainly described.

In step S905, the face detection unit 112 acquires image data from the image sensor 104 and detects a target image from the acquired image data. In step S906, the system control circuit 110 considers the result of the face detection obtained in step S905. When the face detection has succeeded (YES in step S906), the process proceeds to step S907. When the face detection has not succeeded (NO in step S906), the process proceeds to step S911.

In step S911, the image display unit 124 displays an icon or warning indicating that no face can be found. The system control circuit 110 determines whether the user has operated a focus position moving button included in the operation unit 146 within a predetermined time since the display of the information. With this focus position moving button, the user can provide an instruction to move the focus lens position either to the closest distance side or the infinite distance side. When the focus position moving button is operated within a predetermined time (YES in step S911), the process proceeds to step S912. When the focus position moving button is not operated within a predetermined time (NO in step S911), the process proceeds to step S913.

In step S912, the system control circuit 110 determines whether the focus lens can be moved in a direction instructed by the user in step S911. More specifically, when the user provides an instruction for moving the focus lens position to the closest distance side, the system control circuit 110 determines whether the focus lens is positioned at the end of the closest distance side. However, when the user provides an instruction for moving the focus lens position to the infinite distance side, the system control circuit 110 determines whether the focus lens is positioned at the end of the infinite distance side. When the system control circuit 110 determines that the focus lens position is positioned at the end and so that this position cannot be moved any further (YES in step S912), the process proceeds to step S913. When it is determined that the focus lens position can be moved (NO in step S912), the process proceeds to step S914.

In step S913, the system control circuit 110 displays a warning informing the user that the detection has not succeeded via the image display unit 124, for example. Then, the process exits the flowchart.

In step S914, the system control circuit 110 instructs the focus control unit 192 to move the focus lens position by a predetermined amount in a direction instructed by the user in step S911. The predetermined amount may be calculated by the system control circuit 110 in advance in step S904 and is stored in the non-volatile memory 138. After that, the process returns to S905 and the face detection is executed again.

According to the present exemplary embodiment, when the face detection has not succeeded in the depth of field in a particular focus position, the focus lens position is moved in a direction instructed by the user, and the face detection is executed again. The user sees the image displayed on the image display unit 124, so that the user can determine that the target person for face detection is on the closest distance side or on the infinite distance side as compared to the subject in an in-focus state at this point of time. As a result, there may be no need to move the focus lens position in an unnecessary direction even when the face detection is executed using a lens having a shallow depth of field.

Further, the user can instruct a moving direction of the focus position. This can prevent face detection of an untargeted person and accidental selection of the face as a main subject. Furthermore, the face detection may be ended at the point when the face is detected. Thus, it is possible to reduce the time of the face detection as compared to the conventional system.

Once it is determined that the operation of the focus position moving button has been made in step S911, the process may proceed to step S912 without making the determination again until the face is detected or the focus lens reaches the end portion. According to this configuration, the user does not need to operate the focus position moving button every time a determination is made that no face is detected, until the face is detected.

For the sake of clear understanding of the flowchart illustrated in FIG. 9, an example of the relationship among the subject distance, the depth of field for face detection, and the face detection timing will be described with reference to FIG. 10. As described in the flowchart illustrated in FIG. 9, in the actual operation, the face detection is executed by performing focus control of the shooting lens unit 180. For the sake of clear understanding of FIG. 10, the focus lens position is converted to the distance on the side of the subject.

Figure 10:
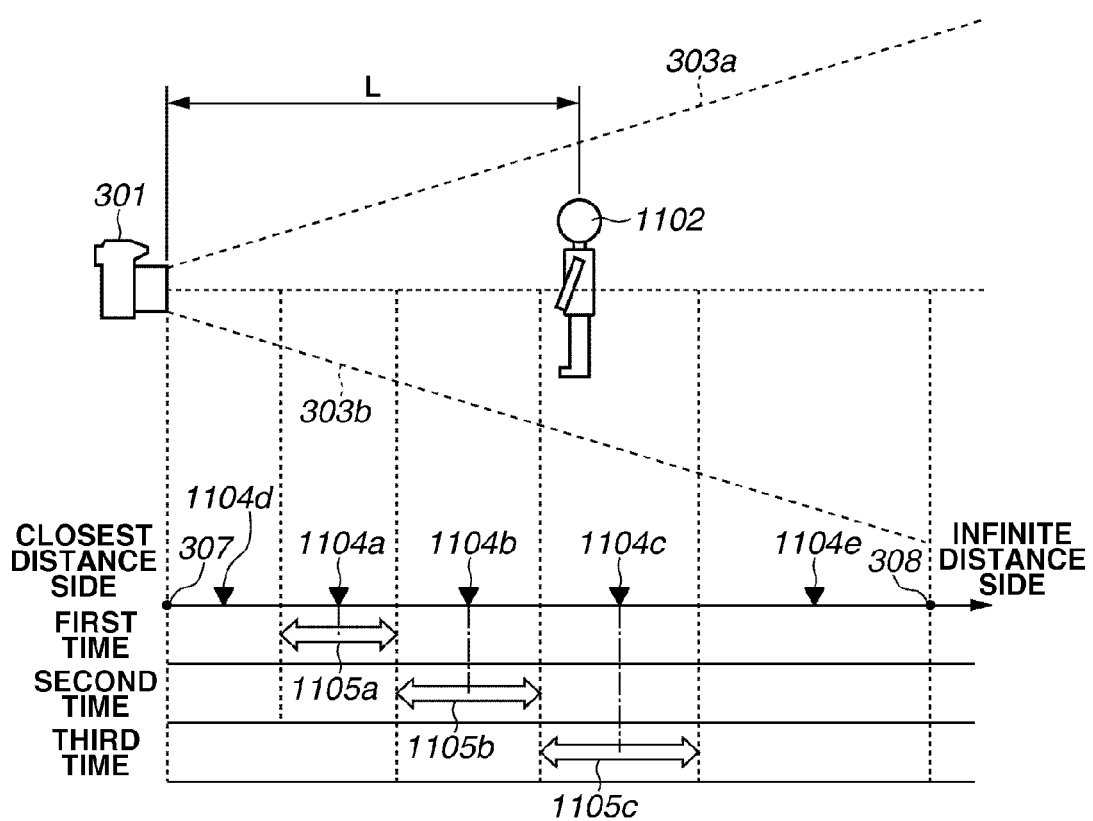
FIG. 10 is a schematic diagram illustrating an example of a relationship among a subject distance, a depth of field and face detection timing, according to the third exemplary embodiment.

The camera 301 illustrated in FIG. 10 includes the imaging apparatus body 100 and the shooting lens unit 180 illustrated in FIG. 1. A person 1102 as a main subject is positioned at a distance L from the front of the camera 301. In FIG. 10, reference numerals 303a and 303b denote a shooting angle of view. Here, the person 1102 is positioned in the shooting angle of view.

Reference numerals 1104a, 1104b, 1104c, 1104d and 1104e illustrated in FIG. 10 denote subject distance positions that are obtained by calculating and converting the focus lens positions of the shooting lens unit 180 to the distances on the subject side. In this case, the face detection is executed according to the flowchart of FIG. 9 while being in the state of FIG. 10. Arrows 1105a, 1105b and 1105c denote the depths of field corresponding to the respective subject distance positions. The subject distance 307 on the infinite distance side and the subject distance 308 on the infinite distance side illustrate a distance limit of the face detection search range.

The subject distance 1104a corresponds to the current focus lens position before starting the face detection operation. At this time, the depth of field 1105a corresponds to the position lens position. As described in step S905 in the flowchart of FIG. 9, the face detection unit 112 executes the face detection in the focus lens position for the first time. The depth of field 1105a corresponds to the subject distance range for executing the first face detection.

As illustrated in FIG. 10, this range does not include the face of the person 1102. Thus, as described in step S911, the system control circuit 110 displays an icon or warning indicating that no face can be detected. The system control circuit 110 determines whether the focus position moving button has been operated within a predetermined time.

When the user operates the focus position moving button to move the focus lens position to the infinite distance side, the focus lens position is allowed to move because the focus lens position is not at the infinite distance end at this point of time. The focus control unit 192 moves the focus lens position to the infinite distance side by a predetermined amount to correspond to the subject distance 1104d in the figure. At this time, the depth of field 1105b corresponds to the subject distance 1104b. Here, the last depth of field 1105a and the depth of field 1105b almost coincide with each other on the infinite distance side of the depth of field 1105a and the closest distance side of the depth of field 1105b. In step S904, the system control circuit 110 calculates the focus lens position in which boundaries of adjacent depths of field almost coincide with each other. The face detection unit 112 executes the second face detection in this depth of field 1105b.

In the present exemplary embodiment, the focus lens position has been set in such a manner that the infinite distance side of the depth of field 1105a and the closest distance side of the depth of field 1105b almost coincide with each other. However, in the above case, the focus lens position may be set such that the infinite distance side of the depth of field 1105a and the closest distance side of the depth of field 1105b may overlap with each other to some extent. As a result, the face of the person can reliably be detected.

However, as illustrated in FIG. 10, there is no face of the person 1102 in this range. Thus, the focus control unit 192 moves the focus lens position to the infinite distance side by a predetermined amount to correspond to the subject distance 1104c in the figure. At this time, the depth of field 1105c corresponds to the subject distance 1104c. The last depth of field 1105b and this depth of field 1105c almost coincide with each other on the infinite distance side of the depth of field 1105b and the closest distance side of the depth of field 1105c. The face detection unit 112 executes the face detection in this depth of field 1105c for the third time.

As illustrated in FIG. 10, the face detection unit 112 can detect the face of the person 1102 in this range. Thus, the system control circuit 110 ends the face detection operation and executes the processing from step S907 thereafter in the flowchart illustrated in FIG. 9.

According to the present exemplary embodiment, the face is searched from the closest distance side to the infinite distance side according to the depth of field of the shooting lens unit without executing the face detection for a predetermined number of times. When the face detection has not succeeded, the focus lens position is moved to execute the face detection operation. The face detection operation is ended immediately when the face detection has succeeded. This prevents incomplete detection of the face and reduces the time for the face detection. Further, the user may specify a direction in which the focus lens position is moved, so that the focus lens position can be moved in a direction where the face exists.

The fourth exemplary embodiment uses an algorithm for completing the face detection at a point of time that a face is detected. Thus, when there is a plurality of persons, the face detection may be ended if a face of an untargeted person is first detected. Accordingly, in the present exemplary embodiment, processing is added which continues the face detection and moves the focus lens position in response to a user instruction even when the face is detected.

Figure 11:
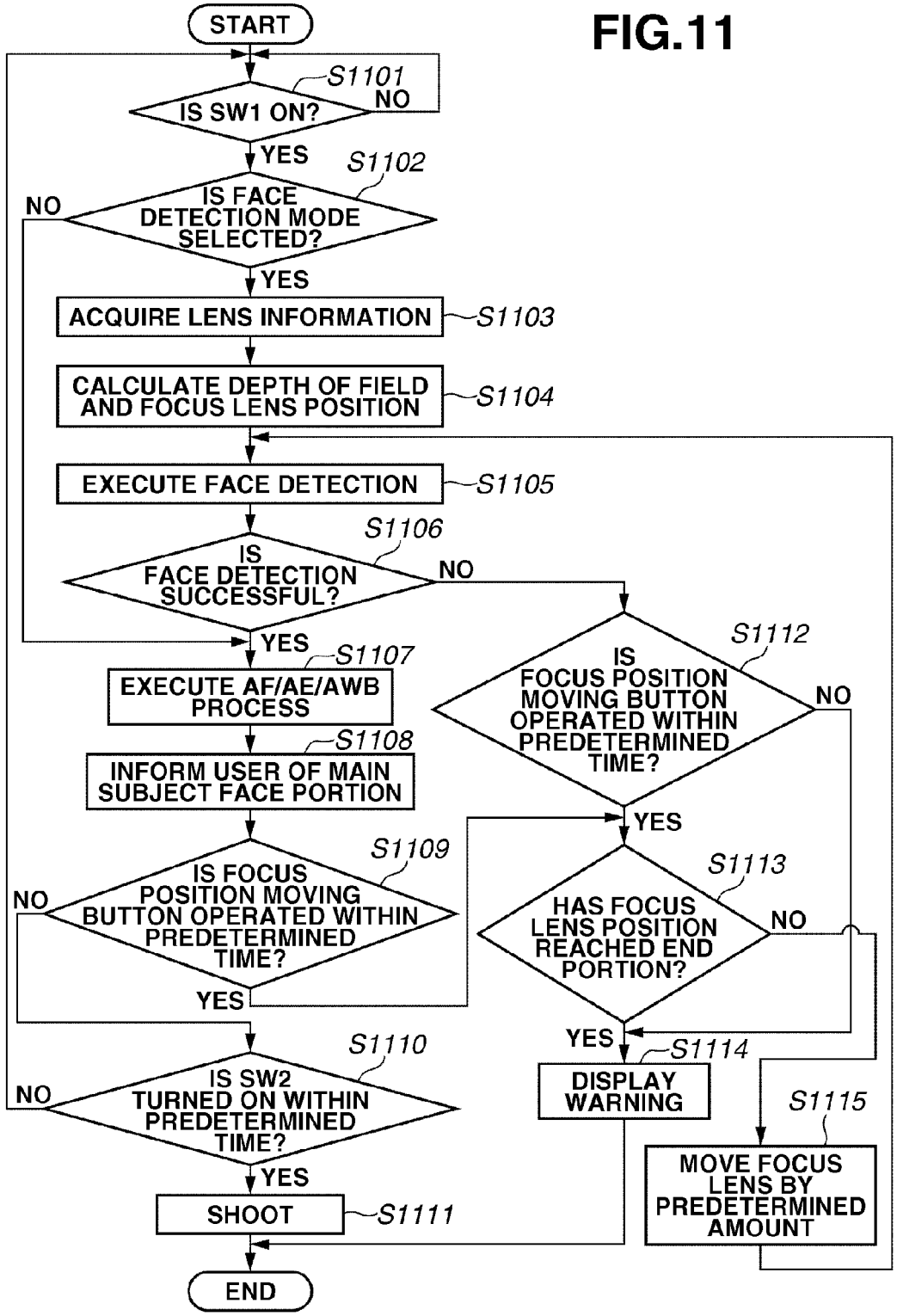
FIG. 11 is a flowchart illustrating an example of an operation on face detection, according to a fourth exemplary embodiment.

In the present exemplary embodiment, an example of the operation for detecting the target image will be described with reference to the flowchart of FIG. 11. The processing from step S901 to S908 in FIG. 9 is similar to the processing from steps S1101 to S1108 in FIG. 11, while the processing from steps S909 to S914 in FIG. 9 is similar to the processing from steps S1110 to S1115 in FIG. 11. Processing in step S1109 of FIG. 11 represents the features of the present exemplary embodiment and so will now mainly be described.

In step S1108, the system control circuit 110 displays image data on which AF processing, AE processing, and AWB processing in step S1107 were performed, on the image display unit 124. The system control circuit 110 informs the user of the face part of the main subject, by displaying a red square frame superimposed on the face part of the main subject that is detected in step S1105.

In step S1109, the system control circuit 110 determines whether the user has operated the focus position moving button included in the operation unit 146 within a predetermined time since the display of the information. When the system control circuit 110 determines that the focus position moving button has not been operated within the predetermined time (NO in step S1109), the system control circuit 110 ends the face detection, and the process proceeds to step S1110.

In step S1110, the system control circuit 110 determines whether the user fully presses the shutter button, i.e., the SW2 is turned ON. When the SW2 is turned ON (YES in step S1110), the process proceeds to step S1111, and the circuit performs a shooting processing. When the SW2 is not turned ON (NO in step S1110), processing returns to step S1101.

In step S1109, if the system control circuit 110 determines that the focus position moving button has been operated within the predetermined time (YES in step S1109), the process proceeds to step S1113. When an untargeted face has been detected, the user operates the focus position moving button, thereby controlling the imaging apparatus to move the focus lens position and execute the face detection again.

In step S1113, the system control circuit 110 determines whether the focus lens can be moved in a direction specified by the user in step S1109. If it is determined that the focus lens position can be moved (NO in step S1113), the focus control unit 192 moves the focus lens position to the user-specified direction by a predetermined amount in step S1115. Processing then returns to step S1105, where the face detection unit 112 executes the face detection again. If it is determined that the focus lens position cannot be moved (YES in step S1113), processing proceeds to step S1114 where a warning is displayed, and processing is then ended.

According to the present exemplary embodiment, even when the face is detected, the focus lens position can be moved, and the face detection can be executed again in response to a user instruction. Thus, even when there is a plurality of faces and a face of an untargeted person is detected, the face detection can be continued until a face of a targeted person is detected.

Figure 12:
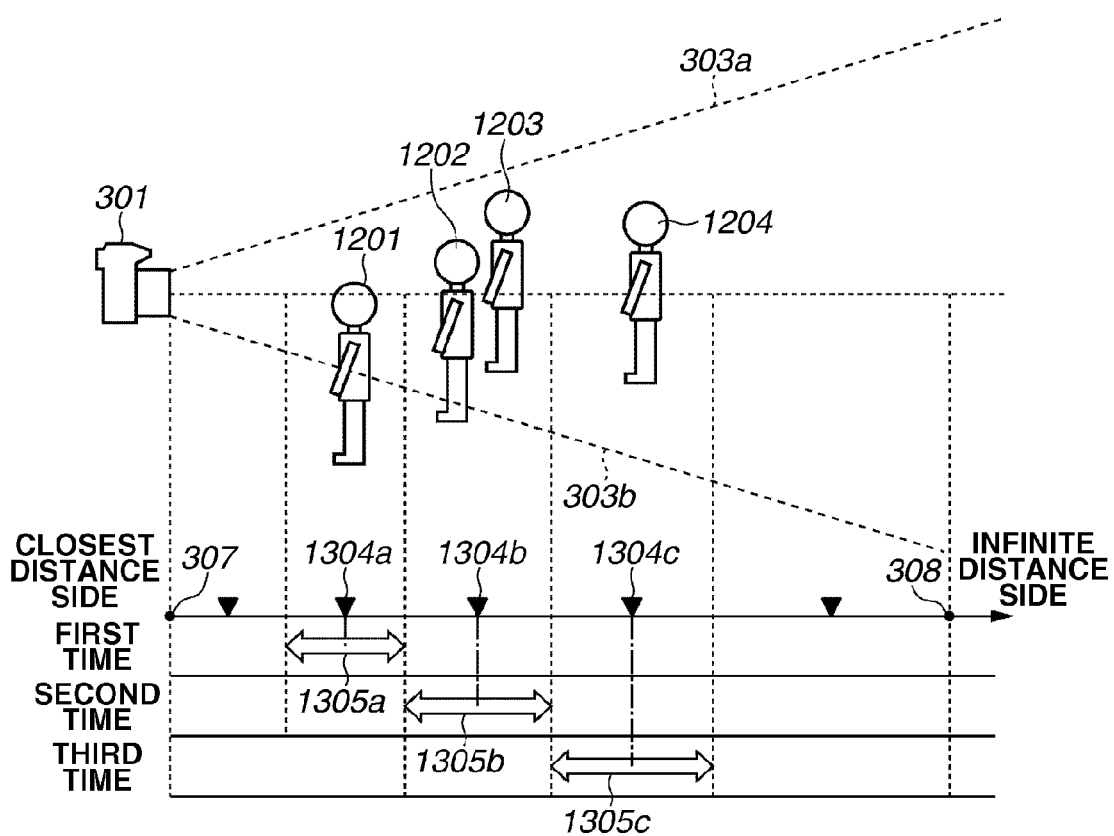
FIG. 12 is a schematic diagram illustrating an example of a relationship among a subject distance, a depth of field and face detection timing, according to the fourth exemplary embodiment.

The camera 301 illustrated in FIG. 12 is similar to the camera illustrated in FIG. 10 and includes the imaging apparatus 110 and the shooting lens unit 180 illustrated in FIG. 1.

Reference numerals 303a and 303b denote shooting angles of view of the camera 301. In FIG. 12, a plurality of persons 1201, 1202, 1203 and 1204 are positioned in the shooting angle of view, and the person 1204 is a main subject targeted by the user.

A subject distance 1304a corresponds to the current focus lens position before starting the face detection operation. At this time, a depth of field 1305a corresponds to the current focus lens position. As described in step S905 in the flowchart illustrated in FIG. 9, the face detection unit 112 executes the first face detection in the focus lens position. More specifically, the depth of field 1305a corresponds to the subject distance range for performing the first face detection. As illustrated in FIG. 12, the face detection unit 112 detects the face of the person 1201 in this subject distance range while the image display unit 124 displays a red square frame superimposed on the face of the person 1201.

The user sees this display, recognizes that the face of the person 1201 on the closest distance side as compared to the person 1204 has been detected, and operates the focus position moving button to move the focus lens position to the infinite distance side. Thus, the focus control unit 192 moves the focus lens position to the infinite distance side by a predetermined amount to correspond to the subject distance 1304b in the figure. The face detection unit 112 executes the second face detection in the depth of field 1305b corresponding to this subject distance 1304b. As illustrated in FIG. 12, the face detection unit 112 detects the faces of the persons 1202 and 1203 in this subject distance range while the image display unit 124 displays a red square frame superimposed on the faces of the persons 1202 and 1203.

The user sees this display, recognizes that the faces of the persons 1202 and 1203 on the closest distance side as compared to the person 1204 have been detected, and operates the focus position moving button to move the focus lens position to the infinite distance side. Thus, the focus control unit 192 moves the focus lens position to the infinite distance side by a predetermined amount to correspond to the subject distance 1304c in the figure. The face detection unit 112 executes the third face detection in the depth of field 1305c corresponding to this subject distance 1304c. As illustrated in FIG. 12, the face detection unit 112 detects the face of the person 1204 in this subject distance range while the image display unit 124 displays a red square frame superimposed on the face of the person 1204.

The user sees this display and recognizes that the face of the preselected person 1204 has been detected. Thus, the user does not operate the focus position moving button. The system control circuit 110 ends the face detection processing and proceeds to the processing of determining whether the SW2 is turned ON.

Similar to the third exemplary embodiment, according to the present exemplary embodiment, the face may be searched from the closest distance side to the infinite distance side according to the depth of field of the shooting lens unit without executing the face detection for a predetermined number of times. When the face of an untargeted person is detected, the imaging apparatus is controlled to move the focus lens position to execute the face detection operation again in response to a user operation. The face detection operation may be ended immediately when the face detection has succeeded. In other words, when the face is detected, the imaging apparatus automatically ends the face detection operation without continuing the operation unless a user operates the focus position moving button. This prevents incomplete detection of the face and reduces the time for the face detection.

In the third exemplary embodiment and the fourth exemplary embodiment, the user issues an instruction for specifying the moving direction of the focus lens. However, according to the present exemplary embodiment, the user simply issues an instruction to move or not to move the focus lens, and the imaging apparatus sets the moving direction of the focus lens.

Figure 13:
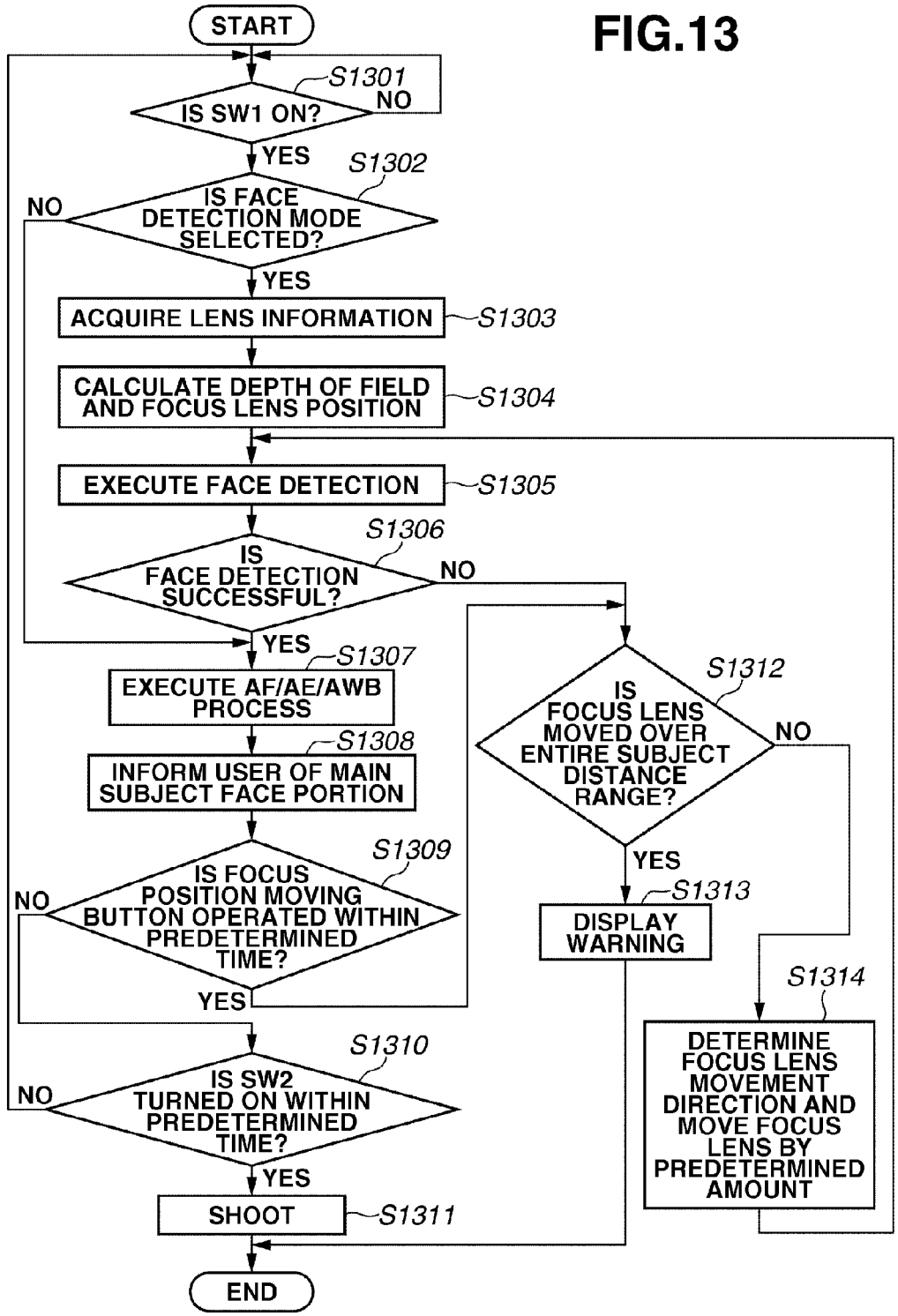
FIG. 13 is a flowchart illustrating an example of an operation for face detection, according to a fifth exemplary embodiment.

In the present exemplary embodiment, an example of an operation for detecting a target image will be described with reference to the flowchart of FIG. 13. The processing from step S901 to S908 in FIG. 9 is similar to processing of step S1301 to S1308 in FIG. 13, while processing in step S909, S910 and S913 in FIG. 9 is similar to processing of step S1310, 1311 and S1313 in FIG. 13. Processing in step S1309, 1312 and S1314 in FIG. 13 represent the features of the present exemplary embodiment and so will now mainly be described.

In step S1308, the system control circuit 110 displays image data on which AF processing, AE processing, and AWB processing were performed by the system control circuit 110 in step S1307, on the image display unit 124. The system control circuit 110 informs the user of the face part of the main subject by displaying, for example, a red square frame on the face part that is detected in step S1305.

In S1309, the system control circuit 110 determines whether the user has operated the focus position moving button included in the operation unit 146 within a predetermined time since the display was performed. If it is determined that the focus position moving button has not been operated within a predetermined time (NO in step S1309), the system control circuit 110 ends the face detection, and the process proceeds to step S1310.

In step S1310, the system control circuit determines whether the user fully has pressed the shutter button within a predetermined time, i.e., whether the SW2 is turned ON. If the SW2 is turned on (YES in step S1310), the system control circuit 110 proceeds to the processing in step S1311 to execute shooting processing. If the SW2 is not turned on (NO in step S1310), processing returns to step S1301.

In step S1309, if the system control circuit 110 determines that the focus position moving button has been operated within a predetermined time in step S1309 (YES in step S1309), the process proceeds to step S1312. If an untargeted face has been detected, the user operates the focus position moving button, thereby controlling the imaging apparatus to move the focus lens position to execute the face detection again.

In step S1312, the system control circuit 110 determines whether the focus lens has been moved to all driving positions calculated in step S1304. Every time the processing of step S1314 described below is executed, the movement position of the focus lens is stored, for example, in the non-volatile memory 138.

If the system control circuit 110 determines that the focus lens has been moved into all driving positions calculated in step S1304 (YES in step S1312), the process proceeds to step S1313. In step S1313, the system control circuit 110 displays a warning to inform the user, via the image display unit 124, that the face detection has not succeeded and the process exits the flowchart.

However, if the system control circuit 110 determines that the focus lens has not been moved to some driving position (NO in step S1312), the process proceeds to step S1314. In step S1314, the system control circuit 110 issues an instruction for moving the focus lens to the driving position to which the lens has not been moved yet, to the focus control unit 192. This driving position is previously calculated by the system control circuit 110 in step S904, and the system control circuit 110 stores the focus lens position to which the focus lens position has been moved. Processing then returns to step S1305.

According to the present exemplary embodiment, in response to an instruction from the user, the focus lens position is moved, and the face detection is executed again even when the face has been detected. At this time, the user simply issues an instruction to move or not to move the focus lens while the imaging apparatus determines the moving direction of the focus lens. Thus, as compared with the fourth exemplary embodiment, a user's time and labor in an operation can be reduced.

Figure 14:
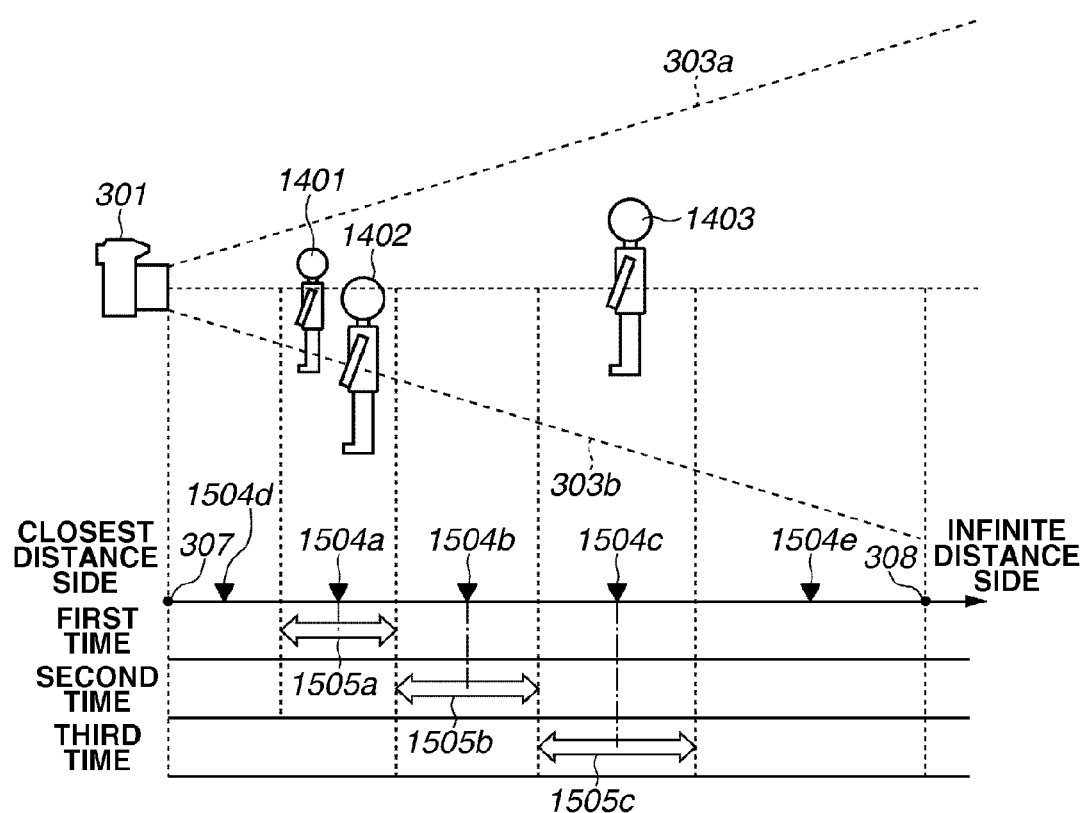
FIG. 14 is a schematic diagram illustrating an example of a relationship among a subject distance, a depth of field and face detection timing, according to the fifth exemplary embodiment.

The camera 301 illustrated in FIG. 14 is similar to the camera illustrated in FIG. 10 and includes the imaging apparatus body 100 and the shooting lens unit 180 illustrated in FIG. 1. The reference numerals 303a and 303b denote a shooting angle of view of the cameral 301. In FIG. 14, a plurality of persons 1401, 1402 and 1403 is positioned in the shooting angle of view, and the person 1403 is a main subject targeted by the user.

A subject distance 1504a corresponds to the current focus lens position before starting the face detection operation. At this time, a depth of field 1505a corresponds to this position. Thus, the face detection unit 112 executes the first face detection in the focus lens position.

The user sees this display, recognizes that the faces of the persons 1401 and 1402 are detected and the face of the person 1403 is not detected, and operates the focus position moving button. The focus control unit 192 moves the focus lens position to one of subject distances 1504b, 1504c, 1504d and 1504e that are not yet included in the depth of field among the subject distances corresponding to the driving positions of the focus lens calculated in step S1304. In this case, the imaging apparatus moves the focus lens to a position near the subject distance 1504a at this point of time and corresponding to either one of the positions 1504b and 1504d to which the focus lens has not been moved yet. In this case, the focus lens may be moved to both of the subject distances 1504b and 1504d. However, in the present exemplary embodiment, the focus control unit 192 moves the focus lens position to the subject distance 1504b on the infinite distance side.

The face detection unit 112 executes the second face detection in the depth of field 1505b corresponding to this subject distance 1504b. However, as illustrated in FIG. 14, this range does not include any face of a person. Thus, the focus lens position is moved to a position corresponding to the subject distance 1504c that is the nearest to the subject distance 1504b among the subject distances 1504c, 1504d and 1504e, which are not included in the depth of field. The face detection unit 112 executes the third face detection in the depth of field 1505c corresponding to this subject distance 1504c. As illustrated in FIG. 14, the face detection unit 112 detects the face of the person 1403 in this subject distance range, while the image display unit 124 displays a red square frame superimposed on the face of the person 1403.

The user sees this display, and recognizes that the face of the person 1403 has been detected. Thus, the system control circuit 110 ends the face detection processing and proceeds to the processing for determining whether the SW2 is turned on without operation of the focus position moving button by the user.

Similar to the third exemplary embodiment, also according to the present exemplary embodiment, the face is searched from the closest distance side to the infinite distance side according to the depth of field of the shooting lens unit, without executing the face detection for a predetermined number of times. Further, when an untargeted face is detected, the imaging apparatus is controlled to move the focus lens position and to execute the face detection operation again. The face detection operation is ended immediately when the detection of the targeted face has succeeded. This prevents incomplete detection of the face and reduces the time for the face detection.

Functions of the units included in the imaging apparatus or the steps of the imaging method according to the exemplary embodiments of the present invention may be at least in part realized by operating a program(s) stored in a computer-readable medium such as a random access memory (RAM) or a read only memory (ROM) of a computer.

A computer-readable medium having a software program(s) that may be capable of realizing functions according to aspects of the invention may be supplied directly or remotely to a system or an apparatus. Then, the system or the apparatus reads and executes the supplied program codes and/or computer-executable instructions to implement functions thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2008-167872 filed Jun. 26, 2008 and 2009-020232 filed Jan. 30, 2009, which are hereby incorporated by reference herein in their entirety.

What is claimed is:

1. An imaging apparatus comprising:
an imaging unit configured to receive an optical image transmitted through a lens unit and configured to convert the image into image data;
a face image detection unit configured to detect a face image from the image data converted by the imaging unit;
a size determination unit configured to determine whether the face image detected by the face image detection unit is larger than a predetermined size; and
a focus control unit configured to move a focus position of the lens unit by a predetermined amount,
wherein, in a case where the face image detection unit does not succeed in detecting the face image, the focus control unit moves the focus position of the lens unit by the predetermined amount and the face image detection unit detects the face image from image data converted by the imaging unit in the moved focus position,
wherein, in a case where the face image detection unit does succeed in detecting the face image but the size determination unit determines that the face image detected by the face image detection unit is not larger than the predetermined size, the focus control unit moves the focus position of the lens unit by the predetermined amount and the face image detection unit detects the face image from image data converted by the imaging unit in the moved focus position, and
wherein the focus control unit does not move the focus position of the lens unit by the predetermined amount and the face image detection unit ends detection of the face image, when the face image detection unit succeeds in detecting the face image and the size determination unit determines that the face image detected by the face image detection unit is larger than the predetermined size.

2. The imaging apparatus according to claim 1, wherein the predetermined amount is decided based on a depth of field of the lens unit.

3. An imaging apparatus comprising:
an imaging unit configured to receive an optical image transmitted through a lens unit and to convert the image into image data;
a face image detection unit configured to detect a face image from the image data converted by the imaging unit;
a display unit configured to display a result of the face image detected by the face image detection unit;
a determination unit configured to determine whether a user has provided an instruction for moving the lens position;
a focus lens position calculation unit configure to determine a depth of field of the lens unit and calculate a plurality of focus positions of the lens unit corresponding to divided up steps in the determined depth of field; and
a focus control unit configured to move a focus position of the lens unit by a predetermined amount to a next focus position step when the determination unit determines that the user has provided the instruction for moving the lens position,
wherein in a case where the result of the face image detected by the face image detection unit is displayed on the display unit and the determination unit determines that a user has not provided the instruction for moving the lens position with a predetermined time after the display unit displays the result, the focus control unit does not move the focus position of the lens unit,
wherein in a case where the result of the face image detected by the face image detection unit is displayed on the display unit and the determination unit determines that the user has provided the instruction for moving the lens position with the predetermined time after the display unit displays the result, the focus control unit moves the focus position of the lens unit by the predetermined amount to the next focus lens position step, and
wherein the face image detection unit detects the face image from image data converted by the imaging unit in the moved focus position when the focus control unit moves the focus position of the lens unit by the predetermined amount.

4. The imaging apparatus according to claim 3, wherein the focus control unit decides whether the focus position of the lens unit is moved to a closest distance side or an infinite distance side.

5. The imaging apparatus according to claim 3, wherein the focus control unit automatically moves the focus position of the lens unit by a predetermined amount, and the face image detection unit detects the face image again from image data converted by the imaging unit in the moved focus position, when the face image detection unit cannot detect the face image, and
the focus control unit moves the focus position of the lens unit by a predetermined amount, and the face image detection unit detects the face image again from image data converted by the imaging unit in the moved focus position, when the face image detection unit detects the face image and the determination unit determines that the user has provided the instruction for moving the lens position.

6. An imaging method comprising:
detecting a face image from image data converted by an imaging unit configured to receive an optical image transmitted through a lens unit and to convert the image into the image data;
determining whether the face image detected from the image data is larger than a predetermined size; and
moving a focus position of the lens unit by a predetermined amount,
wherein, in a case where detection of the face image does not succeed, the focus position of the lens unit is moved by the predetermined amount and the face image is detected from the image data converted by the imaging unit in the moved focus position,
wherein, in a case where detection of the face image does succeed but it is determined that the detected face image is not larger than the predetermined size, the focus position of the lens unit is moved by the predetermined amount and the face image is detected from the image data converted by the imaging unit in the moved focus position, and
wherein the focus position of the lens unit is not moved by the predetermined amount and detection of the face image is ended, when the face image is detected and the detected face image is larger than the predetermined size.

7. An imaging method comprising:
detecting a face image from image data converted by an imaging unit configured to receive an optical image transmitted through a lens unit and to convert the image into the image data;
displaying a result of the detected face image;
determining whether a user has provided an instruction for moving the lens position;
determining a depth of field of the lens unit and calculating a plurality of focus positions of the lens unit corresponding to divided up steps in the determined depth of field; and
moving a focus position of the lens unit by a predetermined amount to a next focus position step when it is determined that the user has provided the instruction for moving the lens position;
wherein in a case where the result of the detected face image is displayed and it is determined that the user has not provided the instruction for moving the lens position within a predetermined time after the result is displayed, the focus position of the lens unit is not moved,
wherein in a case where the result of the detected face image is displayed and it is determined that the user has provided the instruction for moving the lens position with the predetermined time after the result is displayed, the focus position of the lens unit is moved by the predetermined amount to the next focus lens position step, and
wherein the face image is detected from the image data converted by the imaging unit in the moved focus position when the focus position of the lens unit is moved by the predetermined amount.

* * * * *